United States Patent
Toya et al.

(10) Patent No.: US 10,516,165 B2
(45) Date of Patent: Dec. 24, 2019

(54) NICKEL-COBALT-MANGANESE COMPLEX HYDROXIDE PARTICLES AND METHOD FOR PRODUCING SAME, POSITIVE ELECTRODE ACTIVE MATERIAL FOR NONAQUEOUS ELECTROLYTE SECONDARY BATTERY AND METHOD FOR PRODUCING SAME, AND NONAQUEOUS ELECTROLYTE SECONDARY BATTERY

(71) Applicants: SUMITOMO METAL MINING CO., LTD., Minato-ku, Tokyo (JP); TOYOTA JIDOSHA KABUSHIKI KAISHA, Toyota-shi, Aichi (JP)

(72) Inventors: Hiroyuki Toya, Niihama (JP); Shin Imaizumi, Fukushima (JP); Kensaku Mori, Niihama (JP); Atsushi Fukui, Niihama (JP); Kenji Ikeuchi, Tokyo (JP); Kazuomi Ryoshi, Niihama (JP); Toshiyuki Osako, Yokohama (JP); Hiroki Nagai, Toyota (JP)

(73) Assignees: SUMITOMO METAL MINING CO., LTD., Tokyo (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/918,956

(22) Filed: Mar. 12, 2018

(65) Prior Publication Data
US 2018/0205080 A1    Jul. 19, 2018

Related U.S. Application Data

(62) Division of application No. 13/513,244, filed as application No. PCT/JP2010/007035 on Dec. 2, 2010, now Pat. No. 9,954,224.

(30) Foreign Application Priority Data

Dec. 2, 2009    (JP) .................................. 2009-274518

(51) Int. Cl.
  *H01M 4/505*    (2010.01)
  *C01G 53/00*    (2006.01)
  (Continued)

(52) U.S. Cl.
  CPC ............ *H01M 4/505* (2013.01); *C01G 53/00* (2013.01); *C01G 53/006* (2013.01); *C01G 53/50* (2013.01);
  (Continued)

(58) Field of Classification Search
  None
  See application file for complete search history.

(56) References Cited

U.S. PATENT DOCUMENTS

2003/0054251 A1    3/2003  Ohzuku et al.
2006/0081818 A1    4/2006  Ito
(Continued)

FOREIGN PATENT DOCUMENTS

JP    10-029820 A    2/1998
JP    H10-214624 A    8/1998
(Continued)

OTHER PUBLICATIONS

Lee, et al., Synthetic optimization Li[Ni1/3Co1/3Mn1/3]O2 via co-precipitation, Electrochim Acta, 50, 939-948 (Year: 2004).*
(Continued)

*Primary Examiner* — Daniel S Gatewood
(74) *Attorney, Agent, or Firm* — Kratz, Quintos & Hanson, LLP

(57) ABSTRACT

An object of the present invention is to provide nickel cobalt manganese composite hydroxide particles having a small
(Continued)

particle diameter and a uniform particle size distribution, and a method for producing the same. A method for producing a nickel cobalt manganese composite hydroxide by a crystallization reaction is provided. The method includes: a nucleation step of performing nucleation by controlling a pH of an aqueous solution for nucleation including metal compounds containing nickel, cobalt and manganese, and an ammonium ion donor to 12.0 to 14.0 in terms of the pH as measured at a liquid temperature of 25° C. as a standard; and a particle growth step of growing nuclei by controlling a pH of an aqueous solution for particle growth containing nuclei formed in the nucleation step to 10.5 to 12.0 in terms of the pH as measured at a liquid temperature of 25° C. as a standard.

2 Claims, 8 Drawing Sheets

(51) Int. Cl.
*H01M 4/131* (2010.01)
*H01M 4/525* (2010.01)
*H01M 10/052* (2010.01)

(52) U.S. Cl.
CPC ........... *H01M 4/131* (2013.01); *H01M 4/525* (2013.01); *H01M 10/052* (2013.01); *C01P 2002/52* (2013.01); *C01P 2002/72* (2013.01); *C01P 2004/03* (2013.01); *C01P 2004/52* (2013.01); *C01P 2004/61* (2013.01); *C01P 2006/40* (2013.01); *Y02T 10/7011* (2013.01)

(56) References Cited

U.S. PATENT DOCUMENTS

2006/0083989 A1 4/2006 Suhara et al.
2009/0035659 A1 2/2009 Takeuchi et al.
2010/0209771 A1 8/2010 Shizuka et al.

FOREIGN PATENT DOCUMENTS

| JP | 2002-208400 A | 7/2002 |
| JP | 2003-081639 A | 3/2003 |
| JP | 2003-086182 A | 3/2003 |
| JP | 2004-193115 A | 7/2004 |
| JP | 2004-311297 A | 11/2004 |
| JP | 2005-332713 A | 12/2005 |
| JP | 2007-070205 A | 3/2007 |
| JP | 2008-147068 A | 6/2008 |
| JP | 2008-266136 A | 11/2008 |
| JP | 2009-081130 A | 4/2009 |
| WO | 2004/092073 A1 | 10/2004 |

OTHER PUBLICATIONS

PCT/JP2010/007035: International Search Report dated Mar. 15, 2011.
Lee et al., Synthetic optimization of Li[Ni1/3Co1/3Mn1/3]O2 via co-precipitation, Sep. 2004, Electrochim Acta, 50, 939-948.
Li et al., TiO2 coating of LiNi1/3Co1/3Mn1/3O2 cathode materials for Li-ion batteries, Ionics (2006) 12:215-218.
Motoki, "Development of lithium ion battery active material and electrode material technology," Science & Technology Co., Ltd., EDUPRESS Inc., Tokyo, Japan, issued Jan. 30, 2014, pp. 3-5 and 122-123 with front and back cover pages and Table of Contents (12 page document with three page partial English-language translation).
Y. Huang et al.; "A modified Al2O3 coating process to enhance the electrochemical performance of Li(Ni1/3Co1/3Mn1/3)O2 and its comparison with traditional Al2O3 coating process;" Journal of Power Sources; 195; Jul. 15, 2010; pp. 8267-8274 (8 sheets).

* cited by examiner

F I G. 1
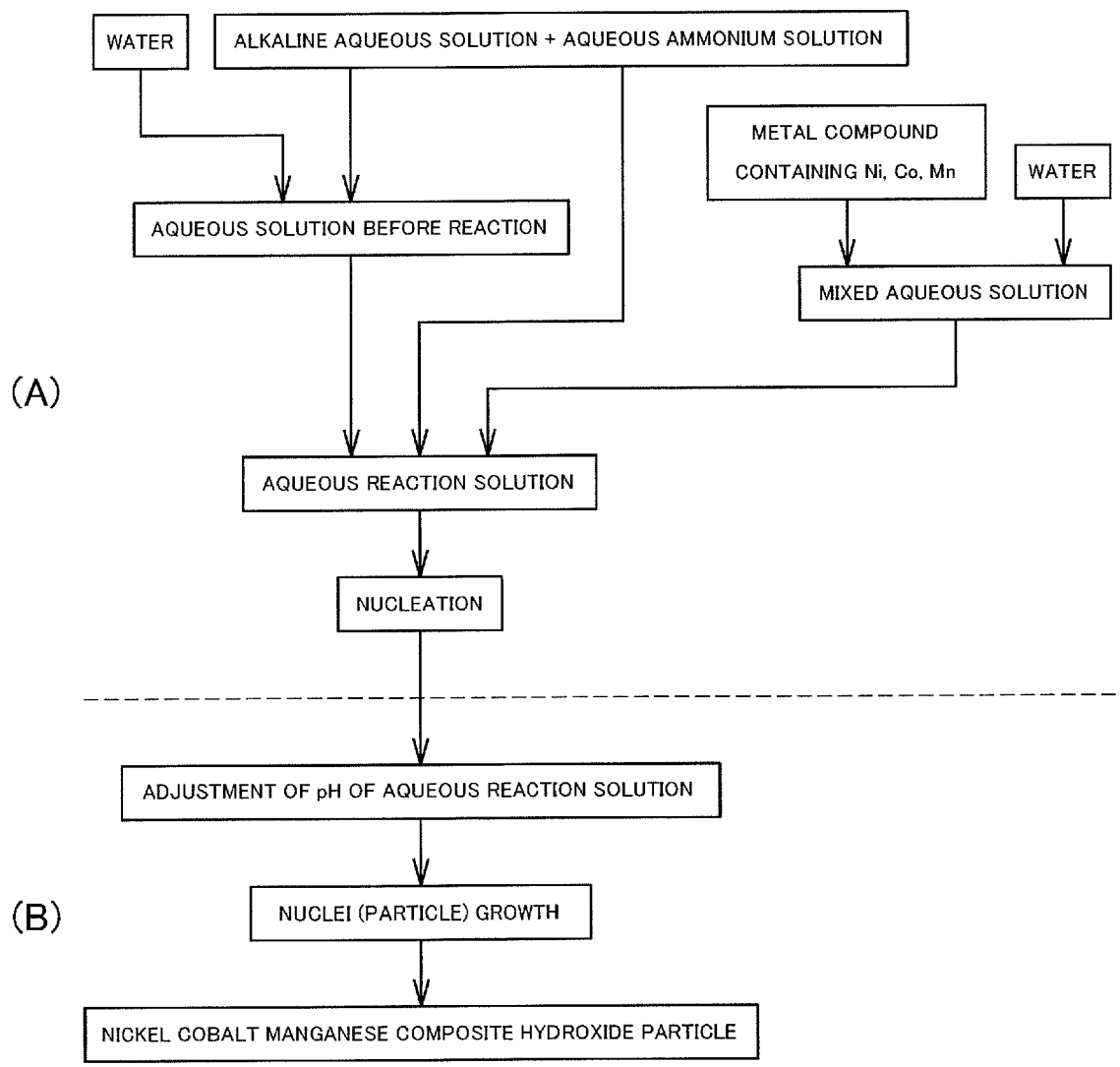

F I G. 3
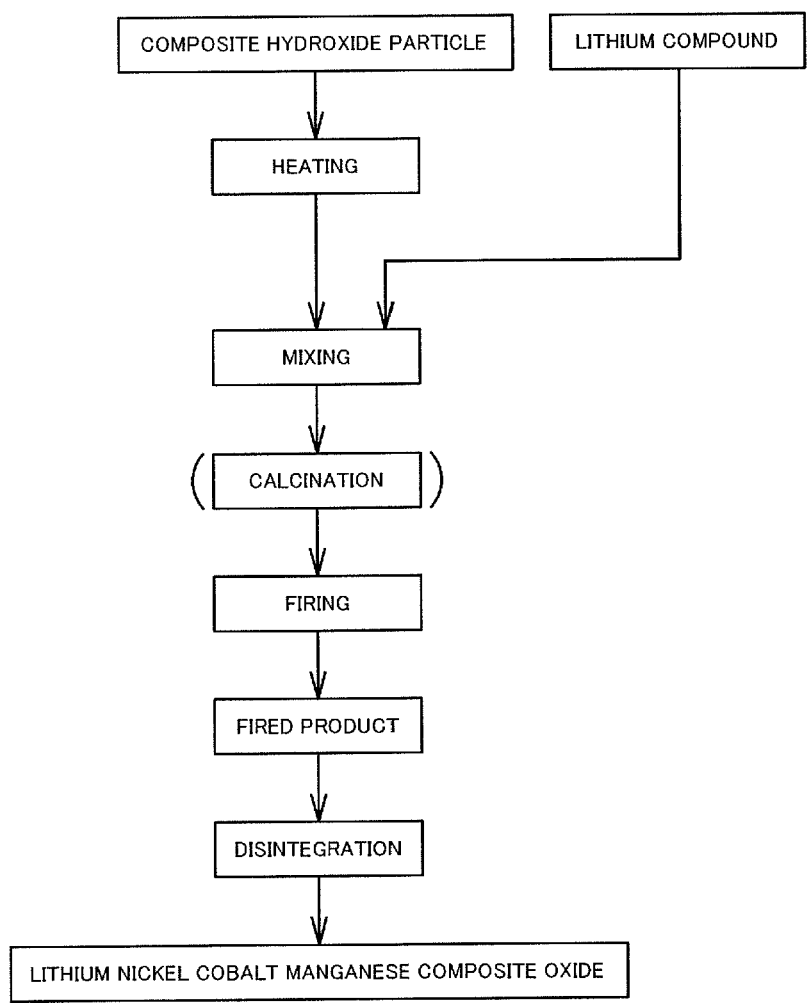

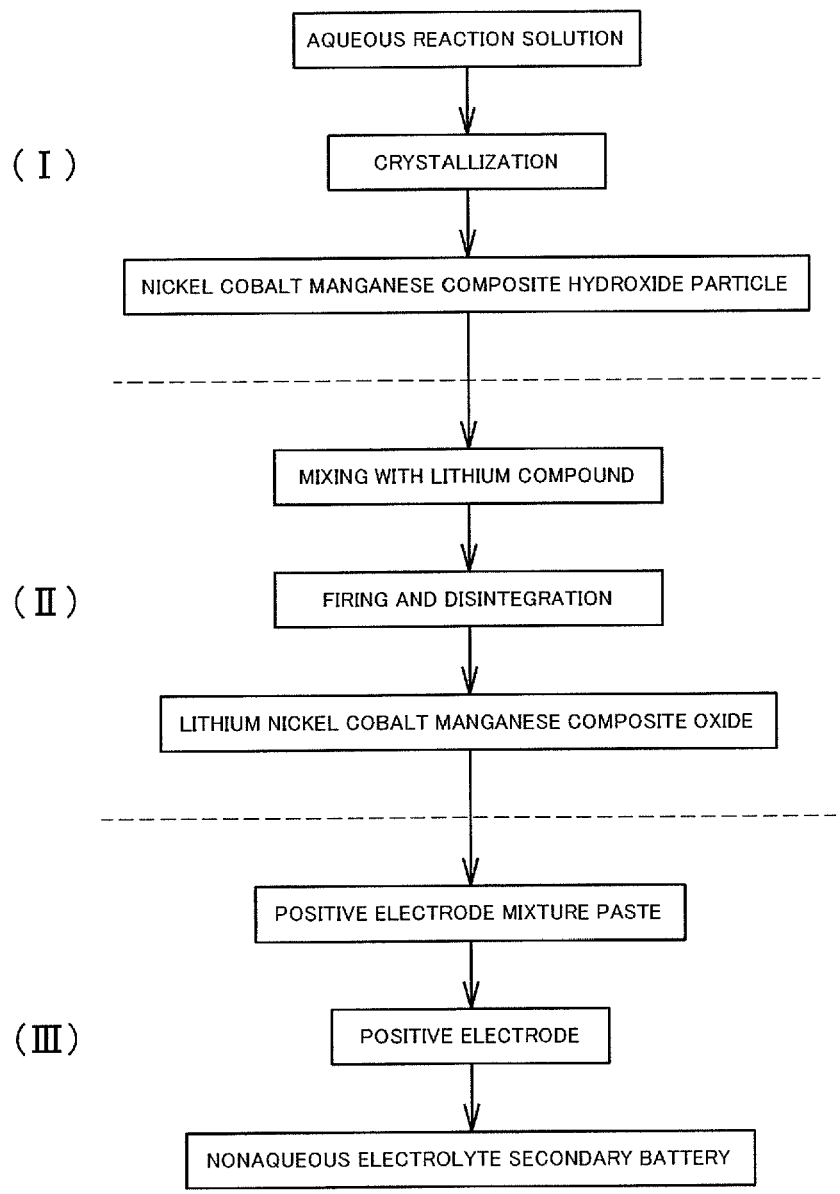

F I G. 5

|  | Composite hydroxide | | Positive-electrode active material | | Battery | | |
| --- | --- | --- | --- | --- | --- | --- | --- |
|  | Average particle diameter ($\mu$m) | (d90−d10)/ average particle diameter | Average particle diameter ($\mu$m) | (d90−d10)/ average particle diameter | Initial discharge capacity (mAh·g$^{-1}$) | 500 cycle capacity retention rate (%) | Positive electrode resistance ratio |
| Example 1 | 3.6 | 0.48 | 3.8 | 0.55 | 158.0 | 91 | 0.57 |
| Example 2 | 3.6 | 0.48 | 3.7 | 0.54 | 157.1 | 90 | 0.72 |
| Example 3 | 3.6 | 0.48 | 3.9 | 0.57 | 154.2 | 92 | 0.75 |
| Example 4 | 3.6 | 0.48 | 3.7 | 0.53 | 155.3 | 89 | 0.72 |
| Example 5 | 3.6 | 0.48 | 3.6 | 0.53 | 157.6 | 90 | 0.61 |
| Example 6 | 3.6 | 0.48 | 3.9 | 0.57 | 156.9 | 89 | 0.62 |
| Example 7 | 3.7 | 0.47 | 3.9 | 0.55 | 155.7 | 91 | 0.59 |
| Example 8 | 4.1 | 0.49 | 4.6 | 0.52 | 155.4 | 89 | 0.56 |
| Example 9 | 3.9 | 0.50 | 4.0 | 0.53 | 160.4 | 86 | 0.70 |
| Example 10 | 3.2 | 0.53 | 3.5 | 0.57 | 171.8 | 85 | 0.77 |
| Example 11 | 3.2 | 0.53 | 3.4 | 0.55 | 170.6 | 86 | 0.67 |
| Example 12 | 3.7 | 0.47 | 3.8 | 0.52 | 155.5 | 90 | 0.79 |
| Example 13 | 6.1 | 0.49 | 5.9 | 0.44 | 156.2 | 92 | 0.74 |
| Example 14 | 3.5 | 0.47 | 4.0 | 0.55 | 157.8 | 92 | 0.62 |
| Example 15 | 3.8 | 0.48 | 3.7 | 0.52 | 159.1 | 91 | 0.61 |
| Example 16 | 4.4 | 0.43 | 4.3 | 0.52 | 158.5 | 90 | 0.62 |
| Comparative Example 1 | 5.9 | 0.58 | 5.8 | 0.63 | 156.5 | 80 | 1.00 |
| Comparative Example 2 | 8.3 | 0.52 | 8.3 | 0.55 | 155.7 | 90 | 1.07 |
| Comparative Example 3 | 6.2 | 0.90 | − | − | − | − | − |
| Comparative Example 4 | 3.6 | 0.48 | 11.5 | 0.92 | 141.4 | 79 | 1.41 |
| Comparative Example 5 | 3.6 | 0.48 | 4.2 | 0.59 | 145.6 | 82 | 1.16 |
| Comparative Example 6 | 3.6 | 0.48 | 3.9 | 0.54 | 130.2 | 82 | 1.77 |
| Comparative Example 7 | 3.7 | 0.48 | 4.0 | 0.59 | 149.9 | 85 | 1.10 |

FIG. 6
(A) 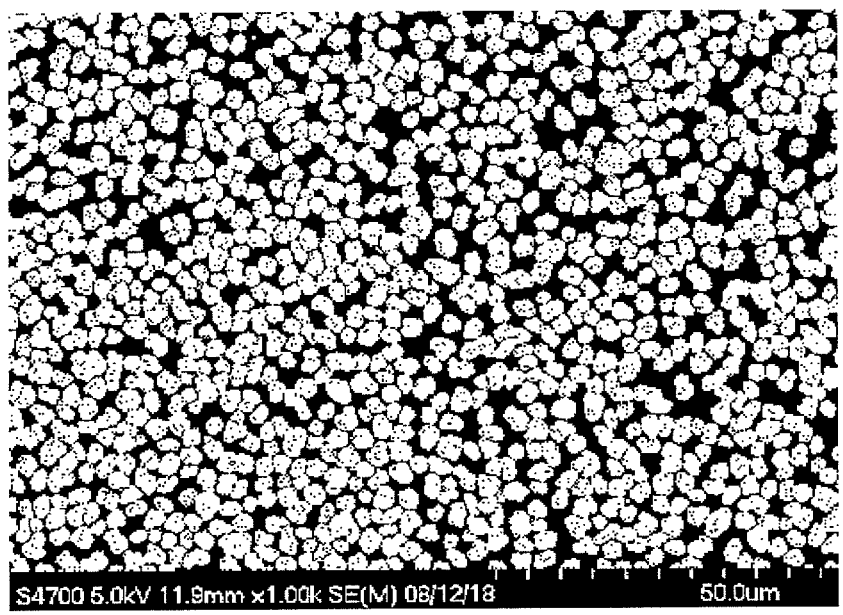
(B) 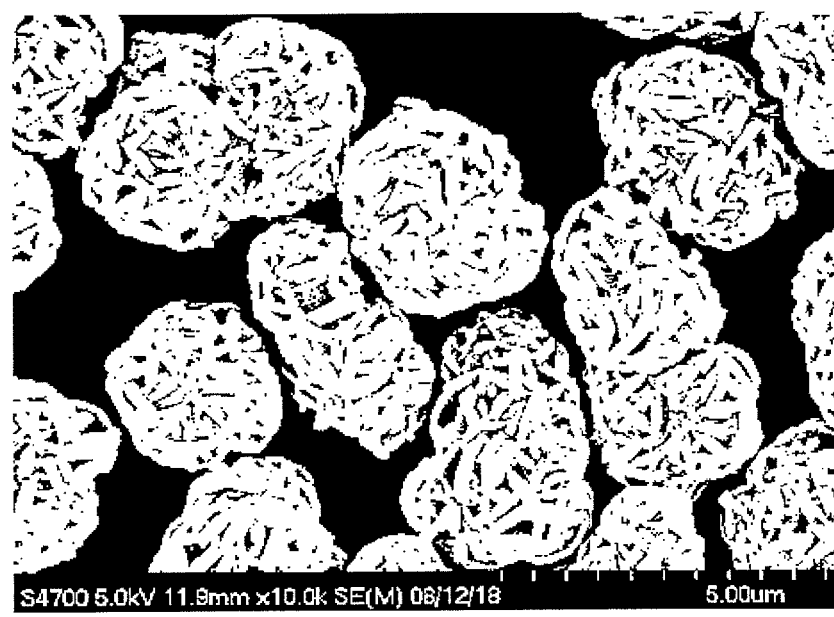

NICKEL-COBALT-MANGANESE COMPLEX HYDROXIDE PARTICLES AND METHOD FOR PRODUCING SAME, POSITIVE ELECTRODE ACTIVE MATERIAL FOR NONAQUEOUS ELECTROLYTE SECONDARY BATTERY AND METHOD FOR PRODUCING SAME, AND NONAQUEOUS ELECTROLYTE SECONDARY BATTERY

CROSS REFERENCE TO RELATED APPLICATIONS

This application is a divisional of U.S. application Ser. No. 13/513,244, filed Jun. 28, 2012, which is a 371 application of International Application No. PCT/JP2010/007035, filed Dec. 2, 2010, which claims priority to Japanese Patent Application No. 2009-274518, filed Dec. 2, 2009, which are hereby incorporated herein by reference in their entirety.

TECHNICAL FIELD

The present invention relates to nickel cobalt manganese composite hydroxide particles and a method for producing the same, a cathode active material for a nonaqueous electrolyte secondary battery and a method for producing the same, and a nonaqueous electrolyte secondary battery.

BACKGROUND ART

In recent years, along with the spread of mobile electronic devices such as mobile phones and notebook-sized personal computers, development of smaller and lighter nonaqueous electrolyte secondary batteries having a high energy density has been strongly demanded.

Development of high-power secondary batteries as batteries for electric automobiles typified by hybrid automobiles has also been strongly demanded.

The secondary batteries that meet such demands are exemplified by lithium ion secondary batteries. Lithium ion secondary batteries include a negative electrode, a positive electrode, an electrolytic solution and the like, in which a material into and from which lithium can be inserted and desorbed has been used as an active material for the negative and positive electrodes.

Research and development of the lithium ion secondary batteries have been extensively carried out at present, and in particular, lithium ion secondary batteries in which a layer or spinel type lithium metal composite oxide is used as a positive electrode material can give a voltage as high as 4 V; therefore, practical applications thereof as batteries having a high energy density have been accelerated.

As positive electrode materials for use in such lithium ion secondary batteries, lithium cobalt composite oxide (LiCoO$_2$) that can be relatively easily synthesized, lithium nickel composite oxide (LiNiO$_2$) in which nickel less expensive than cobalt is used, lithium nickel cobalt manganese composite oxide (LiNi$_{1/3}$Co$_{1/3}$Mn$_{1/3}$O$_2$), lithium manganese composite oxide (LiMn$_2$O$_4$) in which manganese is used, and the like have been hitherto proposed. Among these, lithium nickel cobalt manganese composite oxide has been receiving attention as a material in which excellent cycle characteristics can be achieved and high power can be obtained with a low resistance, when being used as a positive electrode.

As requirements for achieving the above favorable performances of positive electrodes (excellent cycle characteristics, low resistance and high power), positive electrode materials are required to include particles having a uniform and appropriate particle diameter.

The grounds for such requirements are that use of a material having a large particle diameter and a small specific surface area leads to failure in reserving a sufficient area for reaction with the electrolytic solution, thereby resulting in an increase of the reaction resistance and failure in obtaining a battery having high power, and that use of a material having a broad particle size distribution leads to reduction of the battery capacity, thereby resulting in defects such as an increase of the reaction resistance. The battery capacity is reduced because the voltage applied to the particles in the electrode becomes ununiform, so that fine particles selectively deteriorate due to repetition of charge and discharge.

Therefore, it is necessary to produce particles so as to have an appropriate and uniform particle diameter also in the case of the aforementioned lithium nickel cobalt manganese composite oxide in order to improve performances of the positive electrode material.

Since lithium nickel cobalt manganese composite oxides are generally produced from a composite hydroxide, it is necessary to use one having a small and uniform particle diameter as a composite hydroxide employed as a raw material thereof in order to obtain particles having an appropriate and uniform particle diameter.

That is, for improving performances of the positive electrode material to produce a final product, or a lithium ion secondary battery having high performances, it is necessary to use a composite hydroxide including particles having a small particle diameter and a narrow particle size distribution, as the composite hydroxide employed as a raw material of the lithium nickel cobalt manganese composite oxide for forming the positive electrode material.

Concerning a method for producing a composite hydroxide, various proposals have been made up to the present (Patent Literatures 1 to 3).

Patent Literature 1, for example, discloses that a nickel cobalt manganese composite hydroxide is precipitated by continuously or intermittently applying an aqueous solution of nickel-cobalt-manganese salt, an aqueous solution of an alkaline metal hydroxide and an ammonium ion donor to a reaction system, adjusting a temperature of the reaction system to an almost constant value within a range of 30° C. to 70° C., and making the reaction proceed with its pH maintaining at an almost constant value within a range of 10 to 13. Patent Literature 1 also discloses that an intermediate having a preferable particle size distribution can be obtained by a multi-stage reaction than a one-stage reaction, and a part of produced particles may be returned to a reaction vessel for controlling a property of the produced particles.

Patent Literature 2 discloses a method for producing a cathode active material for a lithium secondary battery, in which lithium-coprecipitated composite metal salt with its particles having a approximately spherical shape is synthesized by continuously supplying to a reaction vessel an aqueous solution of composite metal salt with the salt concentration adjusted by dissolving the salt of each structural element of the substance described above in water, a water soluble complexing agent that forms metal ions and complex salt, and an aqueous lithium hydroxide solution and generating composite metal complex salt; then decomposing the complex salt by the lithium hydroxide to cause the lithium-coprecipitated composite metal salt to be precipitated; and repeating the generation and decomposition of the complex salt while circulating in the vessel to obtain the lithium-coprecipitated composite metal salt by overflowing the same. The cathode active material obtained by this method using composite metal salt as a raw material reportedly has a high filling density, a uniform composition and a nearly spherical shape.

Patent Literature 3 proposes a method for producing a cathode active material for a nonaqueous electrolyte batteries, in which an oxide or a hydroxide as a precursor is obtained by simultaneously introducing into a reaction vessel an alkali solution with an aqueous solution containing at least two kinds of transition metal salt or at least two kinds of aqueous solutions of each different transition metal salt, and then performing coprecipitation while allowing a reducing agent to coexist or an inert gas to flow. This method itself is not for controlling a particle diameter but for preventing an imperfect solid solubility at an atomic level. An apparatus for obtaining a hydroxide or an oxide having a spherical shape, a high density and a large particle diameter, however, is disclosed therein.

The apparatus employs a system described below. A mixture of an aqueous solution is caused to flow from bottom to top, so that crystal particles whose specific gravity increases because of growth of their crystals to some extent settle out to reach a collecting portion at the bottom. On the other hand, ungrown crystal particles do not reach the bottom because they are pushed back by a force of the solution flowing from the bottom. That the apparatus is for obtaining crystal particles having a large particle diameter by classifying and collecting the generated crystals.

However, Patent Literature 1 does not disclose a specific method for controlling the particle size distribution or property of the produced particles, but merely discloses that the composite hydroxide was obtained at a constant temperature and pH in Examples.

Patent Literature 2 discloses a continuous crystallization method in which the product is obtained by overflowing. The particle size distribution is therefore likely to be spread to provide a normal distribution, and thus to obtain particles having an almost uniform particle diameter is difficult.

Further, Patent literature 3 discloses the technique for obtaining crystal particles having a large particle diameter by classifying and obtaining generated crystals. It is however considered that the production conditions need to be strictly controlled in order to obtain a product having a uniform particle diameter, leading to difficulty in production in an industrial scale.

As described above, although various methods for producing a composite hydroxide have been studied, a method capable of producing, in an industrial scale, a composite hydroxide having a small particle diameter with high uniformity thereof has not been developed at present. In order to improve performances of lithium secondary batteries, a method for producing such a composite hydroxide has been demanded.

CITATION LIST

Patent Literature

Patent Literature 1: International. Publication WO2004/092073

Patent Literature 2: Japanese Patent Laid-Open No. 10-214624

Patent Literature 3: Japanese Patent Laid-Open No. 2003-86182

SUMMARY OF INVENTION

Technical Problem

In view of the above problems, an object of the present invention is to provide nickel cobalt manganese composite hydroxide particles having a small particle diameter with high uniformity thereof, and a method which enables such nickel cobalt manganese composite hydroxide particles to be produced.

Another object of the present invention is to provide a cathode active material for a nonaqueous electrolyte secondary battery capable of reducing a value of a positive electrode resistance measured when used in a battery, and a method for producing the same.

Still another object of the present invention is to provide a nonaqueous electrolyte secondary battery that can achieve excellent cycle characteristics and high power.

Solution to Problem (Method for Producing Nickel Cobalt Manganese Composite Hydroxide Particles)

A method for producing nickel cobalt manganese composite hydroxide particles according to a first feature of the present invention is a method for producing nickel cobalt manganese composite hydroxide particles represented by a general formula: $Ni_xCo_yMn_zM_t(OH)_{2+\alpha}$, where $0.3 \leq x \leq 0.7$, $0.1 \leq y \leq 0.4$, $0.1 \leq z \leq 0.5$, $0 \leq t \leq 0.02$, $x+y+z+t=1$, $0 \leq \alpha \leq 0.5$, and M is at least one additional element selected from the group consisting of Ti, V, Cr, Al, Mg, Zr, Nb, Mo, Hf, Ta and W, employing a crystallization reaction. The method includes: a nucleation step of performing nucleation by controlling a pH of an aqueous solution for nucleation containing a metal compound having nickel, cobalt and manganese, and an ammonium ion donor to 12.0 to 14.0 in terms of the pH as measured at a liquid temperature of 25° C. as a standard; and a particle growth step of growing nuclei by controlling a pH of an aqueous solution for particle growth containing nuclei formed in the nucleation step to 10.5 to 12.0 in terms of the pH as measured at a liquid temperature of 25° C. as a standard.

A method for producing nickel cobalt manganese composite hydroxide particles according to a second feature of the present invention is the first feature of the present invention, wherein the aqueous solution for particle growth is formed by adjusting a pH of the aqueous solution for nucleation after completing the nucleation step.

A method for producing nickel cobalt manganese composite hydroxide particles according to a third feature of the present invention is the first feature of the present invention, wherein the aqueous solution for particle growth is prepared by adding the aqueous solution containing the nuclei formed in the nucleation step to an aqueous solution distinct from the aqueous solution for nucleation in which the nuclei have been formed.

A method for producing nickel cobalt manganese composite hydroxide particles according to a fourth feature of the present invention is the first, second or third feature of the present invention, wherein the particle growth step is performed after discharging a part of a liquid portion of the aqueous solution for particle growth after the nucleation step.

A method for producing nickel cobalt manganese composite hydroxide particles according to a fifth feature of the present invention is any one of the first to fourth features of the present invention, wherein a temperature of each aqueous solution is maintained at 20° C. or more in the nucleation step and the particle growth step.

A method for producing nickel cobalt manganese composite hydroxide particles according to a sixth feature of the present invention is any one of the first to fifth features of the present invention, wherein an ammonia concentration of each aqueous solution is maintained within a range of 3 to 25 g/l in the nucleation step and the particle growth step.

A method for producing nickel cobalt manganese composite hydroxide particles according to a seventh feature of the present invention is any one of the first to sixth features of the present invention, wherein a nickel cobalt manganese composite hydroxide obtained in the particle growth step is covered with a compound including at least one of the additional elements.

(Nickel Cobalt Manganese Composite Hydroxide Particles)

Nickel cobalt manganese composite hydroxide particles according to an eighth feature of the present invention are nickel cobalt manganese composite hydroxide particles represented by a general formula: $Ni_xCo_yMn_zM_t(OH)_{2+\alpha}$, where $0.3 \le x \le 0.7$, $0.1 \le y \le 0.4$, $0.1 \le z \le 0.5$, $0 \le t \le 0.02$, $x+y+z+t=1$, $0 \le \alpha \le 0.5$, and M is at least one additional element selected from the group consisting of Ti, V, Cr, Al, Mg, Zr, Nb, Mo, Hf, Ta and W. The nickel cobalt manganese composite hydroxide particles are spherical secondary particles formed by aggregation in a random direction of a plurality of platelike primary particles having an average thickness of 10 to 300 nm and an average length of 100 to 3000 nm.

Nickel cobalt manganese composite hydroxide particles according to a ninth feature of the present invention are the eighth feature of the present invention, wherein the secondary particles have an average particle diameter of 3 to 7 μm, and a value represented by an expression of: [(d90−d10)/average particle diameter] as a marker indicating spreading of a particle size distribution of 0.55 or less.

Nickel cobalt manganese composite hydroxide particles according to a tenth feature of the present invention are the eighth or ninth feature of the present invention, wherein at least one of the additional elements are uniformly distributed inside the secondary particles and/or surfaces thereof are uniformly covered with at least one of the additional elements.

Nickel cobalt manganese composite hydroxide particles according to an eleventh feature of the present invention are the eighth, ninth or tenth feature of the present invention, wherein the nickel cobalt manganese composite hydroxide particles are produced by the production method according to any one of the first to seventh features of the present invention.

(Method for Producing Cathode Active Material for Nonaqueous Electrolyte Secondary Battery)

A method for producing a cathode active material for a nonaqueous electrolyte secondary battery according to a twelfth feature of the present invention is a method for producing a cathode active material represented by a general formula: $Li_{1+u}Ni_xCo_yMn_zM_tO_2$, where $-0.05 \le u \le 0.20$, $x+y+z+t=1$, $0.3 \le x \le 0.7$, $0.1 \le y \le 0.4$, $0.1 \le z \le 0.4$, $0 \le t \le 0.02$, and M is at least one additional element selected from the group consisting of Ti, V, Cr, Al, Mg, Zr, Nb, Mo, Hf, Ta and W, the cathode active material including a lithium nickel cobalt manganese composite oxide of a composite oxide containing lithium with a layer structure belonged in a hexagonal crystal system. The method include: a step of subjecting the nickel, cobalt manganese composite hydroxide particles according to any one of the eighth to eleventh features of the present invention to a heat treatment; a mixing step of forming a mixture by mixing a lithium compound with particles after the heat treatment, and adjusting a ratio of a sum of the numbers of atoms of metals other than lithium to the number of atoms of lithium included in the mixture to 1:0.95 to 1.20; and a firing step of firing the mixture formed in the mixing step at a temperature of 800° C. to 1000° C.

A method for producing a cathode active material for a nonaqueous electrolyte secondary battery according to a thirteenth feature of the invention is the twelfth feature of the present invention, wherein calcination is performed at a temperature of 350° C. to 800° C. before the firing step.

(Cathode Active Material for Nonaqueous Electrolyte Secondary Battery)

A cathode active material for a nonaqueous electrolyte secondary battery according to a fourteenth feature of the present invention is a cathode active material represented by a general formula: $Li_{1+u}Ni_xCo_yMn_zM_tO_2$, where $-0.05 \le u \le 0.20$, $x+y+z+t=1$, $0.3 \le x \le 0.7$, $0.1 \le y \le 0.4$, $0.1 \le z \le 0.4$, $0 \le t \le 0.02$, and M is at least one additional element selected from the group consisting of Ti, V, Cr, Al, Mg, Zr, Nb, Mo, Hf, Ta and W, the cathode active material including a lithium nickel cobalt manganese composite oxide of a composite oxide containing lithium with a layer structure belonged in hexagonal crystal system, and having an average particle diameter of 2 to 8 μm and a value represented by an expression of: [(d90−d10)/average particle diameter] as a marker indicating spreading of a particle size distribution of 0.60 or less.

A cathode active material for a nonaqueous electrolyte secondary battery according to a fifteenth feature of the present invention is the fourteenth feature of the present invention, wherein the cathode active material for a nonaqueous electrolyte secondary battery is produced by the production method according to the twelfth or thirteenth feature of the present invention.

(Nonaqueous Electrolyte Secondary Battery)

A nonaqueous electrolyte secondary battery according to a sixteenth feature of the present invention has a positive electrode formed with the cathode active material for a nonaqueous electrolyte secondary battery according to the fourteenth or fifteenth feature of the present invention.

Advantageous Effects of Invention (Method for Producing Nickel Cobalt Manganese Composite Hydroxide Particles)

According to the first feature of the present invention, growth of the nuclei is suppressed and thus substantially only the nucleation can be caused in the nucleation step by adjusting the pH of the aqueous solution for nucleation to 12.0 to 14.0. Further, in the particle growth step, only nuclear growth is preferentially caused by adjusting the pH of the aqueous solution for particle growth to 10.5 to 12.0, whereby formation of additional nuclei can be suppressed. Accordingly, as the nuclei can be uniformly grown, uniform nickel cobalt manganese composite hydroxide particles having a narrow range of the particle size distribution can be obtained.

According to the second feature of the present invention, the aqueous solution for particle growth is prepared by adjusting the pH of the aqueous solution for nucleation after completing the nucleation step; therefore, transfer to the particle growth step can be rapidly executed.

According to the third feature of the present invention, the nucleation and the particle growth can be performed in a more clearly separated manner; therefore, the liquid state in each step can be brought into optimal conditions for each step. Thus, the produced nickel cobalt manganese composite hydroxide particles can have a narrower range of the particle size distribution and can be more uniform.

According to the fourth feature of the present invention, a concentration of the nickel cobalt manganese composite hydroxide particles in the aqueous solution for nucleation can be increased, and the particles can be grown in the state of a high concentration of the particles. Thus, particle size distribution of the particles can be further narrowed, and particle density can also be increased.

According to the fifth feature of the present invention, control of the nuclear generation can be facilitated, whereby the nuclei suitable for producing uniform nickel cobalt manganese composite hydroxide particles having a narrow range of particle size distribution can be formed.

According to the sixth feature of the present invention, since the solubility of the metal ions can be adjusted to fall within a predetermined range, particles having regulated shapes and particle diameters can be formed, and the particle size distribution can also be narrowed.

According to the seventh feature of the present invention, durability and output characteristics of a battery can be improved when the cathode active material for a battery which has been formed using the nickel cobalt manganese composite hydroxide particles produced according to the method of the present invention as a raw material is used in the battery.

(Nickel Cobalt Manganese Composite Hydroxide Particles)

According to the eighth feature of the present invention, when the nickel cobalt manganese composite hydroxide particles are mixed with a lithium compound and fired, lithium can be sufficiently diffused in the particles, whereby a favorable cathode active material having uniform distribution of lithium can be obtained. Additionally, when a battery having a positive electrode including the cathode active material is formed, an electrode resistance can be reduced, and deterioration of the electrode can be inhibited even though charge and discharge are repeated.

According to the ninth feature of the present invention, when a cathode active material is produced by using the nickel cobalt manganese composite hydroxide particles as a raw material, the cathode active material can also have uniform particles with a narrow range of the particle size distribution. When a battery having a positive electrode including the cathode active material is formed, an electrode resistance can be reduced, and deterioration of the electrode can he inhibited even though charge and discharge are repeated.

According to the tenth feature of the present invention, durability and output characteristics of a battery can be improved when the cathode active material for a battery which has been formed using the nickel cobalt manganese composite hydroxide particles of the present invention as a raw material is used in the battery.

According to the eleventh feature of the present invention, since uniform nickel cobalt manganese composite hydroxide particles having a narrow range of the particle size distribution can be provided, when a cathode active material is produced using the particles as a raw material, the cathode active material can also have uniform particles having a narrow range of the particle size distribution. Thus, when a battery having a positive electrode including the cathode active material is formed, an electrode resistance can be reduced, and deterioration of the electrode can be inhibited even though charge and discharge are repeated.

(Method for Producing Cathode Active Material for Nonaqueous Electrolyte Secondary Battery)

According to the twelfth feature of the present invention, residual moisture of the nickel cobalt manganese composite hydroxide particles can he removed by the heat treatment, and thus variation of the ratio of the sum of the numbers of atoms of metals to the number of atoms of lithium in the produced lithium nickel cobalt manganese composite oxide can be prevented. Moreover, since firing is performed at the temperature of 800° C. to 1000° C., lithium can be sufficiently diffused in the particles, and the spherical particle shape can be maintained. Therefore, when a battery having a positive electrode formed with thus produced cathode active material is produced, a battery capacity can be increased, and a value of the positive electrode resistance can also be reduced.

According to the thirteenth feature of the present invention, a uniform lithium nickel cobalt manganese composite oxide can be obtained since lithium can be sufficiently diffused.

(Cathode Active Material for Nonaqueous Electrolyte Secondary Battery)

According to the fourteenth feature of the present invention, high output characteristics and a high capacity of a battery can be realized.

According to the fifteenth feature of the present invention, when an electrode including the cathode active material formed with the lithium nickel cobalt manganese composite oxide is used in a battery, a value of the positive electrode resistance to be measured can be reduced and excellent output characteristics of the battery can be achieved.

(Nonaqueous Electrolyte Secondary Battery)

According to the sixteenth feature of the present invention, a battery having an initial discharge capacity of as high as 150 mAh/g or more, and a low positive electrode resistance can be provided, and thermal stability and safety can also be improved.

BRIEF DESCRIPTION OF DRAWINGS

FIG. 1 is a schematic flow chart illustrating steps of producing a nickel cobalt manganese composite hydroxide of the present invention.

FIG. 3 is a schematic flow chart illustrating steps of producing a lithium nickel cobalt manganese composite oxide from the nickel cobalt manganese composite hydroxide of the present invention.

FIG. 4 is a schematic flow chart illustrating steps from production of the nickel cobalt manganese composite hydroxide of the present invention until production of a nonaqueous electrolyte secondary battery.

FIG. 5 is a table showing results of Examples and Comparative Examples.

FIG. 6 shows SEM photographs (magnification of observation: ×1,000, ×10,000) of the nickel cobalt manganese composite hydroxide of the present invention.

DESCRIPTION OF EMBODIMENTS

Figure 2:
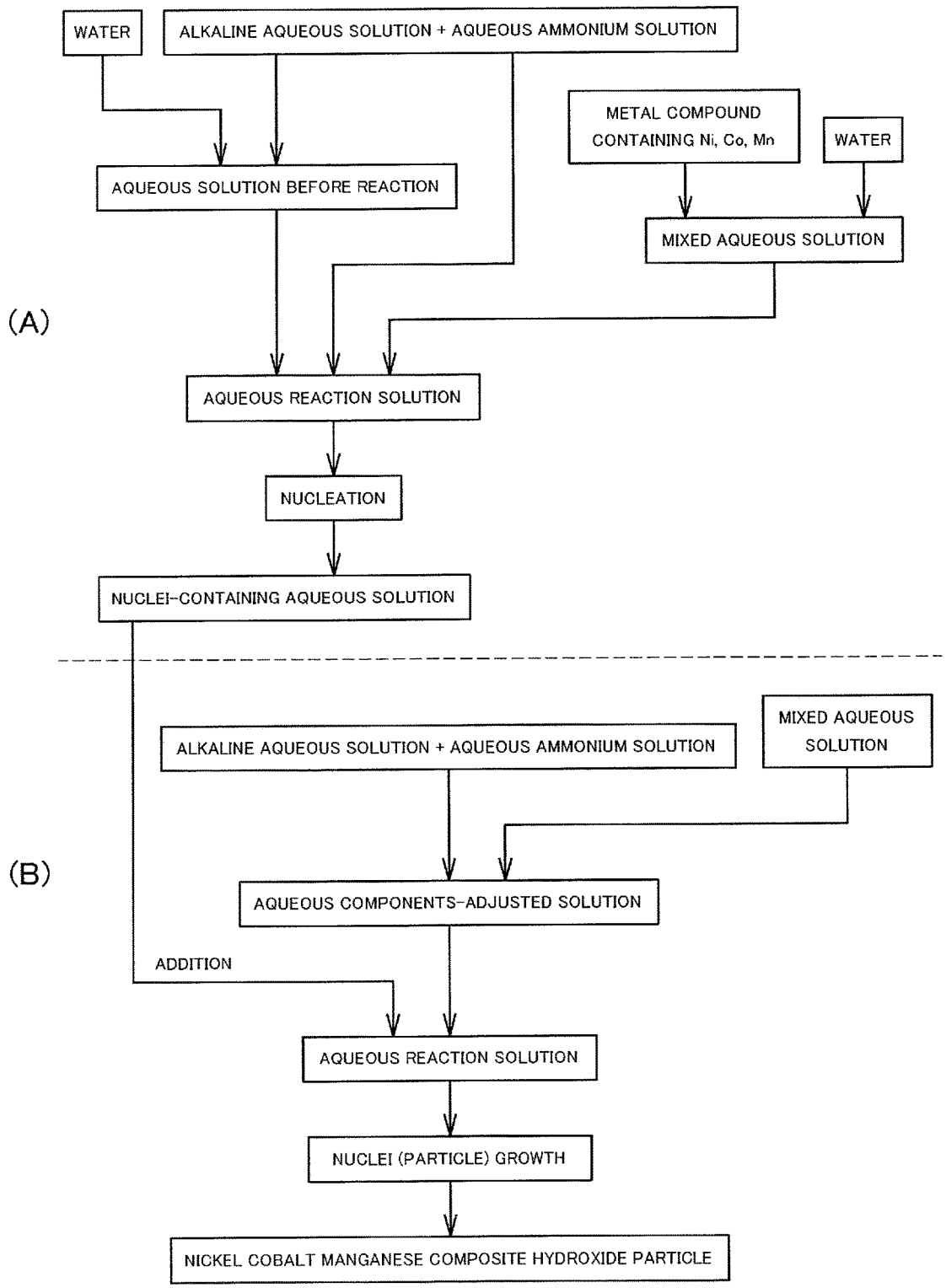
FIG. 2 is a schematic flow chart illustrating other steps of producing the nickel cobalt manganese composite hydroxide of the present invention.

The present invention relates to: (1) a nonaqueous electrolyte secondary battery; (2) a cathode active material for a nonaqueous electrolyte secondary battery used in a positive electrode of the nonaqueous electrolyte secondary battery (1), and a method for producing the same; (3) nickel cobalt manganese composite hydroxide particles employed as a raw material of the cathode active material for a nonaqueous electrolyte secondary battery (2), and a method for producing the same.

In order to improve performances of the nonaqueous electrolyte secondary battery (1), it is necessary to use an electrode in which the cathode active material for a nonaqueous electrolyte secondary battery (2) with excellent battery characteristics is employed. In order to obtain such a cathode active material for a nonaqueous electrolyte secondary battery (2) with excellent battery characteristics, a particle diameter and a particle size distribution thereof are important factors, and a cathode active material having a desired particle diameter and being adjusted to have a desired particle size distribution is preferred. In order to obtain such a cathode active material, it necessary to use the nickel cobalt manganese composite hydroxide particles (3), which are employed as the raw material thereof, having a desired particle diameter and a desired particle size distribution.

The present invention relates to, as described above, a method capable of producing the nickel cobalt manganese composite hydroxide particles (3), which affect the performances of the nonaqueous electrolyte secondary battery (1) of a final product, as uniform particles having a narrow range of the particle size distribution; and the nickel cobalt manganese composite hydroxide particles (3) produced according to this method.

Additionally, a method for producing the cathode active material for a nonaqueous electrolyte secondary battery (2) having a desired particle diameter and adjusted to have a desired particle size distribution using as a raw material the uniform nickel cobalt manganese composite hydroxide particles (3) having a narrow range of the particle size distribution produced by the aforementioned method, and the cathode active material for a nonaqueous electrolyte secondary battery (2) produced by this method are also provided according to the present invention.

Furthermore, the nonaqueous electrolyte secondary battery (1) having a positive electrode including the cathode active material for a nonaqueous electrolyte secondary battery (2) that is produced by the method of the present invention, and that has a desired particle diameter and is adjusted to have a desired particle size distribution is also provided according to the present invention.

Hereinafter, the foregoing features in the present invention (1) to (3) are described in detail. However, before describing the method for producing the nickel cobalt manganese composite hydroxide particles (3) and the nickel cobalt manganese composite hydroxide particles (3), which exhibit the most characteristic features of the present invention, the nonaqueous electrolyte secondary battery (1) of a final product, the method for producing the cathode active material for a nonaqueous electrolyte secondary battery (2) using the nickel cobalt manganese composite hydroxide particles (3) as a raw material, and the cathode active material for a nonaqueous electrolyte secondary battery (2) are described.

(1) Nonaqueous Electrolyte Secondary Battery

The nonaqueous electrolyte secondary battery of the present invention employs a positive electrode including the cathode active material for a nonaqueous electrolyte secondary battery (2) described later, as shown in FIG. 4.

Since such a positive electrode is employed, a battery having an initial discharge capacity of as high as 150 mAh/g or more and a low positive electrode resistance is provided, and an effect of enabling high thermal stability and safety is exerted.

A structure of the nonaqueous electrolyte secondary battery of the present invention is first described.

The nonaqueous electrolyte secondary battery of the present invention (hereinafter, merely referred to as the secondary battery of the present invention) has a structure substantially the same as the structure of general nonaqueous electrolyte secondary batteries except that the cathode active material for a nonaqueous electrolyte secondary battery according to the present invention (hereinafter, merely referred to as the cathode active material of the present invention) is used for a material of the positive electrode.

Specifically, the secondary battery of the present invention has a structure provided with a case, and a positive electrode, a negative electrode, a nonaqueous electrolytic solution and a separator enclosed in the case. More specifically, the secondary battery of the present invention is formed by: laminating the positive electrode and the negative electrode via the separator to form an electrode assembly; impregnating thus obtained electrode assembly with a nonaqueous electrolytic solution; connecting between a positive electrode collector of the positive electrode and a positive electrode terminal communicating with the exterior, and between a negative electrode collector of the negative electrode and a negative electrode terminal communicating with the exterior using leads for power collection or the like; and sealing the case.

It should be noted that the structure of the secondary battery of the present invention is not limited to the above example as a matter of course, and various forms way be employed for the external configuration such as a cartridge, stacked for a or the like.

(Structure of Each Part)

Next, each part of the secondary battery of the present invention is described.

(Positive Electrode)

The positive electrode exhibiting a characteristic feature of the secondary battery of the present invention is first described.

The positive electrode is a sheet-shaped member and formed by coating, for example, a surface of a collector made of aluminum foil with a positive electrode mixture paste containing the cathode active material of the present invention, followed by drying.

The positive electrode is appropriately subjected to a treatment depending on a battery to be used. For example, following treatments may be performed such as a cutting treatment for formation so as to have an appropriate size depending on a size of the intended battery, and a compression treatment by roll pressing or the like for increasing electrode density.

(Positive Electrode Mixture Paste)

The positive electrode mixture paste is prepared by adding a solvent to a positive electrode mixture, followed by kneading.

The positive electrode mixture is prepared by mixing the cathode active material of the present invention in a powdery form with a conductive material and a binder.

The conductive material is added for imparting an adequate electric conductivity to the electrode. Although this conductive material is not particularly limited, examples of the conductive material include graphite (natural graphite, artificial graphite and expanded graphite, etc.), or carbon black based material such as acetylene black or Ketjen black.

The binder plays a role in binding the cathode active material particles. Although the binder for use in the positive electrode mixture is not particularly limited, examples of the binder include polyvinylidene fluoride (PVDF), polytetrafluoroethylene (PTFE), a fluorine rubber, an ethylene-propylenediene rubber, styrene-butadiene rubber, a cellulose based resin and polyacrylic acid.

An activated charcoal or the like may be added to the positive electrode mixture. By adding an activated charcoal or the like, electric double layer capacity of the positive electrode can be increased.

The solvent dissolves the binder to cause the cathode active material, the conductive material, the activated charcoal and the like to disperse in the binder. Although this solvent is not particularly limited, an example of the solvent includes an organic solvent such as N-methyl-2-pyrrolidone.

Moreover, a mixing ratio of each substance in the positive electrode mixture paste is not particularly limited. For example, provided that a solid content of the positive electrode mixture excluding the solvent is 100 parts by mass, a content of the cathode active material may be 60 to 98 parts by mass, a content of the conductive material may be 1 to 20 parts by mass, and a content of the binder may be 1 to 20 parts by mass, similarly to positive electrodes of general nonaqueous electrolyte secondary batteries.

(Negative Electrode)

The negative electrode is a sheet-shaped member formed by coating a surface of a metal foil collector such as copper with a negative electrode mixture paste, followed by drying. Although components of the negative electrode mixture paste and a combination thereof, a material of the collector and the like are different from those of the positive electrode, this negative electrode is formed by a substantially similar manner to the positive electrode described above, and subjected to various types of treatments as needed also similarly thereto.

The negative electrode mixture paste is prepared in a paste form by adding a suitable solvent to a negative electrode mixture prepared by mixing an anode active material and a binder.

As the anode active material, for example, a substance containing lithium such as metal lithium or a lithium alloy, or an absorption substance in and from which lithium ions are absorbed and desorbed may be employed.

Although the absorption substance is not particularly limited, examples of the absorption substance include natural graphite, artificial graphite, fired products of an organic compound such as a phenol resin, and powdery matter of a carbon substance such as coke. When such an absorption substance is employed in the anode active material, a fluorocarbon-containing resin such as PVDF may be used as a binder and an organic solvent such as N-methyl-2-pyrrolidone may be used as the solvent for dispersing the anode active material in the binder, similarly to the positive electrode.

(Separator)

A separator is disposed to be sandwiched between the positive electrode and the negative electrode, thereby separating the positive electrode from the negative electrode, and has a function to retain the electrolyte. As such a separator, a thin membrane of, for example, polyethylene or polypropylene having a large number of very fine pores may be used; however, not particularly limited thereto as long as it has the aforementioned function.

(Nonaqueous Electrolytic Solution)

The nonaqueous electrolytic solution is prepared by dissolving lithium salt as supporting salt in an organic solvent.

Examples of the organic solvent include cyclic carbonates such as ethylene carbonate, propylene carbonate, butylene carbonate and trifluoropropylene carbonate; chain carbonates such as diethyl carbonate, dimethyl carbonate, ethylmethyl carbonate and dipropyl carbonate; ether compounds such as tetrahydrofuran, 2-methyltetrahydrofuran and dimethoxyethane sulfur compounds such as ethylmethylsulfone and butanesulfone; and phosphorus compounds such as triethyl phosphate and trioctyl phosphate. One alone, or at least two as a mixture selected from these may be used.

Examples of supporting salt include $LiPF_6$, $LiBF_4$, $LiClO_4$, $LiAsF_6$, $LiN(CF_3SO_2)_2$, and composite salts thereof.

Still more, the nonaqueous electrolytic solution may contain a radical scavenger, a surfactant and a fire retardant and the like for improving battery characteristics.

(Characteristics of Secondary Battery of the Present Invention)

Since the secondary battery of the present invention has the above configuration and the above positive electrode is used therein, a high initial discharge capacity of 150 mAh/g or more and a low positive electrode resistance are attained, whereby a high capacity and high power are achieved. Also, in comparison with conventional cathode active materials of lithium cobalt oxide or lithium nickel oxide, the secondary battery of the present invention has excellent thermal stability and safety.

(Application of Secondary Battery of the Present Invention)

The secondary battery of the present invention is suitable for electric power supplies for small size mobile electronic devices which consistently require a high capacity (notebook-sized personal computers, mobile phone terminals, etc.), because of the aforementioned properties.

The secondary battery of the present invention is also suitable for batteries for electric automobiles which require high power. When a battery for electric automobiles has a larger size, securing the safety may be difficult and providing an expensive protective circuit is essential. However, the secondary battery of the present invention not only facilitates securing of the safety but simplifies an expensive protective circuit to enable the cost to be reduced because the battery has excellent safety without increasing the size. Additionally, since size reduction and increase of the output are possible, the present battery is suitable for electric power supplies for electric automobiles having limited mounting space.

The secondary battery of the present invention can be used not only as an electric power supply for electric automobiles exclusively driven by electric energy, but also as an electric power supply for so-called hybrid automobiles in which a combustion engine such as a gasoline engine or diesel engine is used in combination.

(2) Cathode Active Material for Nonaqueous Electrolyte Secondary Battery

The cathode active material for a nonaqueous electrolyte secondary battery according to the present invention (hereinafter, referred to as the cathode active material of the present invention) is suitable for a material for positive electrodes of nonaqueous electrolyte secondary batteries as described above.

The cathode active material of the present invention is a cathode active material represented by a general formula: $Li_{1+u}Ni_xCo_yMn_zM_tO_2$, where $-0.05 \leq u \leq 0.20$, $x+y+z+t=1$, $0.3 \leq x \leq 0.7$, $0.1 \leq y \leq 0.4$, $0.1 \leq z \leq 0.4$, $0 \leq t \leq 0.02$, and M is at least one additional element selected from the group consisting of Ti, V, Cr, Al, Mg, Zr, Nb, Mo, Hf, Ta and W, and including a lithium nickel cobalt manganese composite oxide. The cathode active material has particles with a layer structure belonged in hexagonal crystal system in which a value represented by the expression of: [(d90–d10)/average particle diameter] as a marker indicating spreading of a particle size distribution of the particles is 0.60 or less, and is adjusted to have an average particle diameter of 2 to 8 μm.

Considering electrical characteristics and thermal stability, an atomic ratio of nickel, cobalt and manganese is preferably $0.3 \leq x \leq 0.4$, $0.3 \leq y \leq 0.4$, $0.3 \leq z \leq 0.4$.

The proportion of lithium falls within the above range in the general formula. This is because when the proportion of lithium is below the above range, the reaction resistance of the positive electrode in the nonaqueous electrolyte secondary battery with the obtained cathode active material becomes so large that the battery output is reduced, whereas when the proportion of lithium is beyond the above range, the initial discharge capacity of the cathode active material is reduced with increase in the reaction resistance of the positive electrode.

Since the above additional element is added to the cathode active material of the present invention, durability and output characteristics of a battery can he improved when used as a cathode active material of the battery. In particular, when the additional element is adjusted so as to be uniformly distributed on the surfaces or inside of the particles, the aforementioned effect can be achieved by the particles in their entirety. Thus, the effect can be achieved by the addition in a small amount, leading to an advantage capable of inhibiting the reduction of the capacity. The atomic ratio t of the additional element with respect to all the atoms is 0.02 or less. This is because when the atomic ratio t exceeds 0.02, the battery capacity is unpreferably reduced due to the less amount of metal elements that are responsible for a Redox reaction.

(Particle Size Distribution)

Concerning the cathode active material of the present invention, the value represented by the expression of: [(d90–d10)/average particle diameter] as a marker indicating spreading of the particle size distribution is adjusted to 0.6 or less, as described above.

The particle size distribution falling within abroad range suggests that fine particles having a very small particle diameter with respect to the average particle diameter, and particles having a very large particle diameter with respect to the average particle diameter (large-diameter particle) are present in a large number in the cathode active material. When a positive electrode is formed using a cathode active material including a large number of the fine particles, there is a possibility of heat generation resulting from a local reaction of the fine particles, whereby the safety is reduced and the fine particles selectively deteriorate, thus leading to inferior cycle characteristics. On the other hand, when a positive electrode is formed using a cathode active material including a large number of the large-diameter particles, an area for reaction between the electrolytic solution and the cathode active material may not be provided sufficiently to reduce the battery output due to increase in the reaction resistance.

Therefore, when the particle size distribution of the cathode active material is adjusted to have the aforementioned marker [(d90–d10)/average particle diameter] of 0.6 or less, the proportion of the fine particles and the large-diameter particles becomes so low that excellent safety, favorable cycle characteristics and battery output can be achieved in the battery in which this cathode active material is used for the positive electrode.

It is to be noted that in the value represented by the expression of [(d90–d10)/average particle diameter] as a marker indicating spreading of the particle size distribution, when the numbers of particles of each particle diameter are accumulated from those of the smaller particle diameter, "d10" means a particle diameter in which an accumulated volume thereof accounts for 10% of the total volume of all the particles. Further, when the numbers of particles of each particle diameter are accumulated from those of the smaller particle diameter, "d90" means a particle diameter in which the accumulated volume thereof accounts for 90% of the total volume of all the particles.

Although methods for determining the average particle diameter, the "d90" and the "d10" are not particularly limited, for example, they may be determined from volume-integrated values measured with a laser diffraction scattering type particle size analyzer.

(Average Particle Diameter)

The cathode active material of the present invention is preferably adjusted to have the aforementioned particle size distribution and an average particle diameter of 2 to 8 μm. The reason for this preferred range is that: when the average particle diameter is less than 2 μm, packing density of the particles is reduced upon formation of the positive electrode to result in reduction of the battery capacity per volume of the positive electrode, whereas when the average particle diameter exceeds 8 μm, the specific surface area of the cathode active material is reduced to result in reduction of the interface with the electrolytic solution of the battery, whereby the resistance of the positive electrode is increased resulting in deterioration of the output characteristics of the battery.

Therefore, when the cathode active material of the present invention is adjusted to have the aforementioned particle size distribution and an average particle diameter thereof of 2 to 8 μm, preferably 3 to 8 μm, more preferably 3.5 to 6 μm, a battery in which this cathode active material is used for the positive electrode can have a larger battery capacity per volume, and excellent battery characteristics such as excellent safety, high power and the like are achieved.

(Method for Producing Cathode Active Material for Non-aqueous Electrolyte Secondary Battery)

The method for producing the cathode active material of the present invention is not particularly limited as long as a cathode active material can be produced so as to give the aforementioned crystal structure, average particle diameter, particle size distribution and composition. However, to employ the following method is preferred because the cathode active material of the present invention can be produced more certainly.

The method for producing the cathode active material of the present invention includes, as shown in FIG. 3, a) a step of subjecting the nickel cobalt manganese composite hydroxide particles used as a raw material of the cathode active material of the present invention to a heat treatment; b) a mixing step of forming a lithium mixture by mixing a lithium compound with the particles after the heat treatment; and c) a firing step of firing the mixture formed in the mixing step. Thereafter, lithium nickel cobalt manganese composite oxide particles, that is, the cathode active material of the present invention can be obtained by disintegrating a fired product.

The disintegration refers to an operation of applying mechanical energy to aggregates of a plurality of secondary particles generated by sinter necking or the like among the secondary particles during the firing, thereby decomposing the secondary particles to loosen the aggregates almost without breaking the secondary particles.

Hereinafter, each step is described.

a) Heat Treatment Step

The heat treatment step is a step of subjecting the nickel cobalt manganese composite hydroxide particles (hereinafter, merely referred to as composite hydroxide particles) to a heat treatment by heating to remove the moisture contained in the composite hydroxide particles. By performing this heat treatment step, the residual moisture in the particles until the firing step can be reduced. In other words, since the composite hydroxide particles can be converted into composite oxide particles, variation of the ratio of the number of atoms of metals and the ratio of the number of atoms of lithium in the cathode active material to be produced can be prevented.

It is to be noted that not all the composite hydroxide particles are necessarily converted into the composite oxide particles because removal of the moisture to the extent that variation of the ratio of the number of atoms of the metals and the ratio of the number of atoms of lithium in the cathode active material does not occur is acceptable.

In the heat treatment step, the composite hydroxide particles may be heated up to a temperature at which the residual moisture is removed, and the heat treatment temperature is not particularly limited. For example, when the composite hydroxide particles are heated to 105° C. or more, the residual moisture can be removed. The temperature less than 105° C. is not industrially adequate because a long time period is required for removing the residual moisture in upper limit of the temperature for the heat treatment is, for example, preferably 500° C. or less, more preferably 400° C. or less. This is because even though the heat treatment is performed at a temperature of over 500° C., an influence is hardly exerted on characteristics and tendency of the cathode active material to be produced.

An atmosphere in which the heat treatment is performed is not particularly limited, and the treatment is preferably performed in an airflow which can be simply adopted.

Additionally, the heat treatment time period is not particularly limited, but is preferably at least 1 hour or longer, and more preferably 5 to 15 hours because the time period shorter than 1 hour may lead to failure in sufficiently removing the residual moisture in the composite hydroxide particles.

Further, equipment used for the heat treatment is not particularly limited, and any equipment enabling the composite hydroxide particles to be heated in the airflow is acceptable. An, air dryer or an electric furnace not accompanied by gas generation may be suitably used.

b) Mixing Step

In the mixing step, the particles subjected to the heat treatment in the heat treatment step (hereinafter, referred to as heat treated particles) are mixed with a substance containing lithium, for example, a lithium compound, to obtain a lithium mixture.

The heat treated particles refer to nickel cobalt manganese composite hydroxide particles after removing the residual moisture in the heat treatment step, nickel cobalt manganese composite oxide particles converted into the oxide in the heat treatment step, or mixed particles thereof.

The material containing the heat treated particles and lithium is obtained by performing mixing so that a ratio of the number of atoms of lithium (Li) to the numbers of atoms of metals other than lithium in the lithium mixture (namely, the sum of the numbers of atoms of nickel, cobalt, manganese and additional elements (Me)) (Li/Me) is 0.95 to 1.20. That is, the mixing is performed so that Li/Me in the lithium mixture becomes the same as Li/Me in the cathode active material of the present invention. Since the Li/Me does not change before and after the firing step described later, Li/Me mixed in this mixing step corresponds to Li/Me in the cathode active material.

Although the substance containing lithium used for forming the lithium mixture is not particularly limited, in the case of lithium compounds, for example, lithium hydroxide or lithium carbonate, or a mixture thereof is preferred in view of favorable availability. In Particular, considering ease in handling and stability of the quality, lithium carbonate is more preferably used.

The lithium mixture is preferably mixed sufficiently before firing. When the mixing is not sufficient, it is probable to cause problems such as variation of Li/Me among individual particles and failure in achieving sufficient battery characteristics.

Further, a general mixer may be used for the mixing. Examples of a mixer include a shaker mixer, Loedige mixer, JULIA mixer, V blender. The mixer may be used to sufficiently mix the heat treated particles with the substance containing lithium to the extent that an external shape of the composite hydroxide particles and the like is not broken.

c) Firing Step

The firing step is a step of forming a lithium nickel cobalt manganese composite oxide by firing the lithium mixture obtained in the above mixing step. When the lithium mixture is fired in the firing step, lithium in the substance containing lithium is diffused in the heat treated particles, whereby the lithium nickel cobalt manganese composite oxide is formed.

(Firing Temperature)

The firing of the lithium mixture is preferably performed at 800 to 1000° C., more preferably at 850 to 1000° C.

When the firing temperature is less than 800° C., lithium fails to sufficiently diffuse in the heat treated particles, and thus excessive lithium and unreacted particles remain, and/or the crystal structure is not regulated satisfactorily, whereby a problem of failure in achieving sufficient battery characteristics is caused.

Additionally, when the firing temperature exceeds 1000° C., sintering occurs drastically among the heat treated particles, and there is a possibility of causing abnormal particle growth. Accordingly, coarse particles may be formed after the firing, and there is a possibility of failure in maintaining the particle shape (shape of the spherical secondary particles described later). Thus, a problem of reducing the battery capacity is caused because the specific surface area is reduced with increase in the resistance of the positive electrode when the cathode active material is formed.

Therefore, the firing of the lithium mixture is preferably performed at 800 to 1000° C., more preferably at 850 to 1000° C.

(Firing Time Period)

Moreover, the firing time period is preferably at least for 1 hour or longer, more preferably 5 to 15 hours. When the firing time period is shorter than 1 hour, production of the lithium nickel cobalt manganese composite oxide may not be sufficient.

(Calcination)

When a lithium hydroxide, lithium carbonate or the like is particularly used as the substance containing lithium, it is preferred to perform calcination at a temperature of 350 to 800° C. by keeping the substance for about 1 to 10 hours before firing at the temperature of 800 to 1000° C. That is, the calcination is preferably performed at a melting point or at a reaction temperature of the lithium hydroxide or the lithium carbonate. In this case, by keeping the substance at around the melting point or at around the reaction temperature of the lithium hydroxide or the lithium carbonate, diffusion of lithium in the heat treated particles can be sufficiently performed, and thus a uniform lithium nickel cobalt manganese composite oxide can be obtained.

When, as described above, increase of the concentration of the additional element M on the surfaces of the lithium nickel cobalt manganese composite oxide particles is intended, the heat treated particles having their surfaces uniformly covered with the additional element may be used as a raw material. By firing the lithium mixture containing such composite oxide particles under appropriate conditions, the concentration of the additional element on the surfaces of the composite oxide particles can be increased. Specifically, when the lithium mixture containing the heat treated particles covered with the additional element is fired at a lower firing temperature for a shorter firing time period, lithium nickel cobalt manganese composite oxide can be obtained with surfaces of particles thereof having a higher concentration of the additional element M.

Additionally, even in the case where the lithium mixture containing the heat treated particles covered with the additional element is fired, lithium nickel cobalt manganese composite oxide particles having the additional element uniformly distributed in the particles can be obtained with a higher firing temperature and a longer firing time period. In other words, the lithium nickel cobalt manganese composite oxide particles as intended can be obtained by adjusting the heat treated particles of a raw material and firing conditions.

(Firing Atmosphere)

An atmosphere in firing is preferably an oxidizing atmosphere, and more preferably an atmosphere of 18 to 100% by volume of the oxygen concentration. That is, firing is preferably performed in an ambient air or an oxygen flow. When the oxygen concentration is less than 18% by volume, the nickel cobalt manganese composite hydroxide particles included in the heat-treated particles cannot be sufficiently oxidized, and thus crystallinity of the lithium nickel cobalt manganese composite oxide may not be sufficient. Considering the cost in particular, the firing is preferably performed in an air flow.

A furnace used in the firing is not particularly limited, and any furnace enabling the lithium mixture to be heated in an ambient air or oxygen flow is acceptable. An electric furnace not accompanied by gas generation is however preferred, and either one of batch type or continuous type furnace may be used.

(3) Nickel Cobalt Manganese Composite Hydroxide Particles

The nickel cobalt manganese composite hydroxide particles of the present invention (hereinafter, merely referred to as composite hydroxide particles of the present invention) are spherical secondary particles of the nickel cobalt manganese composite hydroxide represented by the general formula: $Ni_xCo_yMn_zM_t(OH)_{2+\alpha}$, where $0.3 \le x \le 0.7$, $0.1 \le y \le 0.4$, $0.1 \le z \le 0.5$, $0 \le t \le 0.02$, $x+y+z+t=1$, $0 \le \alpha \le 0.5$, and M is at least one additional element selected from the group consisting of Ti, V, Cr, Zr, Al, Mg, Nb, Mo, Hf, Ta and W. The nickel cobalt manganese composite hydroxide particles are formed by aggregation in a random direction of a plurality of platelike primary particles having an average thickness of 10 to 300 nm and an average length of 100 to 3000 nm, and are adjusted so that a value represented by the expression of: [(d90−d10)/average particle diameter] as a marker indicating spreading of a particle size distribution thereof is 0.55 or less and an average particle diameter thereof is 3 to 7 μm.

Since the composite hydroxide particles of the present invention are particularly suitable for the raw material for the aforementioned cathode active material of the present invention, the following description is made on the precondition that the composite hydroxide particles are used as a raw material of the cathode active material of the present invention.

When a cathode active material is obtained according to the above production method of the present invention, a composition ratio of the composite hydroxide particles of the present invention (Ni:Co:Mn:M) is maintained even in the cathode active material. The composition ratio of the composite hydroxide particles of the present invention is therefore adjusted similarly to that of an intended cathode active material.

(Particle Structure)

The composite hydroxide particles of the present invention are adjusted to give spherical particles, specifically, spherical secondary particles formed by aggregation of a plurality of platelike primary particle. Since the plurality of the platelike primary particles are adjusted to have an average thickness of 10 to 300 nm and an average length of 100 to 3000 nm, diffusion of lithium can be sufficiently performed in a sintering step of forming the cathode active material and voids in the secondary particles do not increase extremely.

In the case of the average thickness of the platelike primary particles exceeding 300 nm or in the case of the average length thereof exceeding 3000 nm, a spherical property of the secondary particles may be unpreferably impaired. On the other hand, in the case of the average thickness of the platelike primary particles less than 10 nm or in the case of the average length thereof less than 100 nm, voids in the primary particles present in the spherical secondary particles relatively increase. Particles (cathode active material) then become porous even after reaction with the lithium in the sintering step of forming the cathode active material, so that fine powder may be unpreferably generated with repetition of charge and discharge.

Additionally, since the platelike primary particles aggregate in random directions to form the secondary particles, voids are generated almost uniformly among the primary particles, and thus when fired after mixing with the lithium compound, a molten lithium compound distributes in the secondary particles to sufficiently accomplish the diffusion of lithium.

(Particle Size Distribution)

The composite hydroxide particles of the present invention are adjusted to have a value represented by the expression of: [(d90−d10)/average particle diameter] as a marker indicating spreading of the particle size distribution of 0.55 or less.

Since the particle size distribution of the cathode active material is, significantly affected by the composite hydroxide particles of the raw material, contamination of fine particles or coarse particles in the composite hydroxide particles leads to the presence of similar particles also in the cathode active material. In other words, when the value represented by the expression of: [(d90−d10)/average particle diameter] exceeds 0.55, and thus in a state of a broad particle size distribution, fine particles or coarse particles will be present also in the cathode active material.

When the value represented by the expression of: [(d90−d10)/average particle diameter] is adjusted to be 0.55 or less in the composite hydroxide particles of the present invention, the cathode active material obtained using the composite hydroxide particles of the present invention as a raw material can have a narrow range of the particle size distribution, and uniform particle diameters can be attained. Thus, the obtained particle size distribution of the cathode active material can exhibit the aforementioned marker [(d90−d10)/average particle diameter] of 0.6 or less. Accordingly, a battery having an electrode formed with the cathode active material formed with the composite hydroxide particles of the present invention as a raw material can be provided as a battery having favorable cycle characteristics and output.

(Average Particle Diameter)

The composite hydroxide particles of the present invention preferably have the average particle diameter adjusted to 3 to 7 μm. This is because, by adjusting the average particle diameter to 3 to 7 μm, the cathode active material obtained using the composite hydroxide particles of the present invention as a raw material can be adjusted to have a predetermined average particle diameter (2 to 8 μm). Accordingly, the cathode active material of the present invention as described above can be formed using the composite hydroxide particles of the present invention as a raw material.

In this regard, when the composite hydroxide particles of the present invention have an average particle diameter of less than 3 μm, the cathode active material also has a small average particle diameter, whereby the packing density of the positive electrode is reduced to result in reduction of the battery capacity per volume. To the contrary, when the composite hydroxide particles of the present invention have an average particle diameter of over 7 μm, the specific surface area of the cathode active material is reduced to result in reduction of the interface with the electrolytic solution, whereby the resistance of the positive electrode is increased to cause deterioration of the output characteristics of the battery.

The composite hydroxide particles of the present invention therefore have the average particle diameter adjusted to 3 to 7 μm. In this case, the cathode active material of the present invention can be obtained using the composite hydroxide particles of the present invention as a raw material, and when a positive electrode with the cathode active material of the present invention is used for a battery, excellent battery characteristics can be achieved.

(Method for Producing Nickel Cobalt Manganese Composite Hydroxide Particles)

The composite hydroxide particles of the present invention having the above characteristics can be produced by the following method.

The method for producing the composite hydroxide particles of the present invention is a method for producing nickel cobalt manganese composite hydroxide particles by a crystallization reaction and includes a) a nucleation step of performing nucleation and b) a particle growth step of growing the nuclei produced in the nucleation step.

In other words, according to the method for producing the composite hydroxide particles of the present invention, a nucleation reaction and a particle growth reaction do not proceed in the same vessel at the same time as in conventional continuous crystallization methods (see Patent Literatures 2 and 3). The present method is characterized by definite separation of the time period during which the nucleation reaction mainly occurs (nucleation step), and the time period during which the particle growth reaction mainly occurs (particle growth step).

Summary of the method for producing the composite hydroxide particles of the present invention is first described with reference to FIG. 1. In FIG. 1 and FIG. 2, the nucleation step is illustrated in (A), whereas the particle growth step as illustrated in (B).

(Nucleation Step)

As shown in FIG. 1, a plurality of metal compounds containing nickel, cobalt and manganese are first dissolved in water at a predetermined ratio to prepare a mixed aqueous solution. In the method for producing the composite hydroxide particles of the present invention, a composition ratio of each metal in the obtained composite hydroxide particles becomes similar to a composition ratio of each metal in the mixed aqueous solution.

Therefore, the mixed aqueous solution is prepared by adjusting the ratio of the metal compounds to be dissolved in water so that the composition ratio of each metal in the mixed aqueous solution becomes the same as the composition ratio of each metal in the composite hydroxide particles of the present invention.

On the other hand, in the reaction vessel, an alkaline aqueous solution such as an aqueous sodium hydroxide solution, an aqueous ammonia solution containing an ammonium ion donor and water are supplied and mixed to form an aqueous solution. This aqueous solution (hereinafter, referred to as aqueous solution before the reaction) is adjusted to have a pH thereof to fall within the range of 12.0 to 14.0 in terms of the pH as measured at a liquid temperature of 25° C. as a standard, by adjusting an amount of supplied alkaline aqueous solution. An ammonium ion concentration in the aqueous solution before the reaction is concurrently adjusted to 3 to 25 g/l. Furthermore, a temperature of the aqueous solution before the reaction is adjusted to fall within the range of 20 to 60° C. The pH and the ammonium ion concentration of the liquid in the reaction vessel can be measured with a common pH meter and an ion meter, respectively.

When the temperature and the pH of the aqueous solution before the reaction are adjusted, the mixed aqueous solution is supplied into the reaction vessel while the aqueous solution in the reaction vessel is stirred. Since an aqueous solution prepared by mixing the aqueous solution before the reaction with the mixed aqueous solution (hereinafter, referred to as aqueous reaction solution) is formed in the reaction vessel, very fine nuclei of the composite hydroxide of the present invention can be produced in the aqueous reaction solution in this procedure, the pH of the aqueous reaction solution falls within the above range; therefore, the produced nuclei hardly grow, and production of the nuclei occurs preferentially.

Since the nucleation is accompanied by change in the pH and the ammonium ion concentration of the aqueous reaction solution, an alkaline aqueous solution and an aqueous ammonia solution are supplied together with the mixed aqueous solution to the aqueous reaction solution to control the pH and the ammonium ion concentration of the aqueous reaction solution so as to be maintained at predetermined values.

As described above, when the mixed aqueous solution, the alkaline aqueous solution and the aqueous ammonia solution are successively supplied to the aqueous reaction solution, production of additional nuclei persists continuously in the aqueous reaction solution. Subsequently, when the nuclei are produced by a predetermined amount in the aqueous reaction solution, the nucleation step is terminated. Whether or not the nuclei have been produced by the predetermined amount may be determined based on an amount of the metal salt added to the aqueous reaction solution.

The aforementioned aqueous reaction solution, namely an aqueous reaction solution prepared by mixing the mixed aqueous solution, the alkaline aqueous solution and the aqueous ammonia solution, and having the pH adjusted to fall within the range of 12.0 to 14.0 is the aqueous solution for nucleation according to claims.

(Particle Growth Step)

After completing the nucleation step, the pH of the aqueous reaction solution is adjusted to 10.5 to 12.0 in terms of the pH as measured at a liquid temperature of 25° C. as a standard. Specifically, the pH of the aqueous reaction solution is controlled by adjusting the amount of the supplied alkaline aqueous solution.

When the pH of the aqueous reaction solution becomes 12.0 or less, the composite hydroxide particles of the present invention having a predetermined particle diameter are formed in the aqueous reaction solution. In this procedure, since the pH of the aqueous solution falls within the above range, the growth reaction of the nuclei preferentially occurs as compared with the production reaction of the nuclei; therefore, additional nuclei are hardly produced in the aqueous solution.

When composite hydroxide particles having a predetermined particle diameter are produced by a predetermined amount, the particle growth step is terminated. The amount of production of the composite hydroxide particles having the predetermined particle diameter is determined based on the amount of the metal salt added to the aqueous reaction solution.

The aforementioned aqueous reaction solution, namely an aqueous reaction solution prepared by mixing the mixed aqueous solution, the alkaline aqueous solution and the aqueous ammonia solution, and having the pH adjusted to fall within the range of 10.5 to 12.0 is the aqueous solution for particle growth according to claims.

As described above, in the case of the method for producing the composite hydroxide particles, nucleation preferentially occurs while the nuclei growth hardly occurs in the nucleation step, and to the contrary, only the nuclear growth occurs while additional nuclei are hardly produced in the particle growth step. Thus, uniform nuclei having a narrow range of the particle size distribution can be formed in the nucleation step, whereas nuclei can be uniformly grown in the particle growth step. Uniform nickel cobalt manganese composite hydroxide particles having a narrow range of the particle size distribution can therefore be obtained according to the method for producing the composite hydroxide particles.

In the case of the above method, since metal ions are crystallized as the composite hydroxide nuclei or particles in both steps, the proportion of the liquid component with respect to the metal components in the aqueous reaction solution increases. Thus, the supplied mixed aqueous solution seems to have the concentration apparently decreased, and there is a possibility of failure in sufficient growth of the composite hydroxide particles in the particle growth step.

Therefore, after completing the nucleation step or during the particle growth step, a part of the aqueous reaction solution is discharged out from the reaction vessel. Specifically, supply of the mixed aqueous solution and the like to the aqueous reaction solution and stirring of the mixture are stopped to cause the nuclei and composite hydroxide particles to settle out, and then the supernatant of the aqueous reaction solution is discharged. Consequently, relative concentration of the mixed aqueous solution in the aqueous reaction solution can be increased. Thus, the composite hydroxide particles can be grown in the state of the mixed aqueous solution having a relatively high concentration; therefore, the particle size distribution of the composite hydroxide particles can be still more narrowed, and the density of the composite hydroxide particles can also be increased.

Furthermore, the pH of the aqueous solution for nucleation after completing the nucleation step is adjusted to form the aqueous solution for particle growth, and then the particle growth step is performed in the above-described embodiment; therefore, the method is advantageous in that transfer to the particle growth step can be rapidly executed.

However, as shown in FIG. 2, an aqueous components-adjusted solution having a pH and an ammonium ion concentration adjusted suitable for the nucleation step is formed separately from the aqueous solution for particle growth, and an aqueous reaction solution is prepared by adding to this aqueous components-adjusted solution an aqueous solution containing the nuclei that have been subjected to the nucleation step in another reaction vessel. The particle growth step is then performed using the resulting aqueous reaction solution (namely, the aqueous solution for particle growth).

In this case, separation of the nucleation step and the particle growth step can be more certainly ensured; therefore, a state of the aqueous reaction solution in each step can fall under the optimum condition for each step. In particular, from an initial stage of starting the particle growth step, a pH condition of the aqueous reaction solution can be optimized. Accordingly, the nickel cobalt manganese composite hydroxide particles formed in the particle growth step can have a narrower range of the particle size distribution and can be more uniform.

Moreover, in the case of the method according to the present invention, when the aqueous solution for particle growth is formed by adjusting the pH of the aqueous solution for nucleation as described above, the particle growth step can be performed subsequently to the nucleation step. Thus, transfer from the nucleation step to the particle growth step can be executed by merely adjusting the pH of the aqueous reaction solution, and the method is also advantageous in that the pH can also be easily adjusted by temporarily stopping the supply of the alkaline aqueous solution. It should be noted that the pH of the aqueous reaction solution can also be adjusted by adding to the aqueous reaction solution the same type of an inorganic acid as that of the acid of the metal compound, for example, sulfuric acid in the case of sulfuric acid salt.

Next, substances, solutions, and reaction conditions used in each step are described in detail.

(pH)

(Nucleation Step)

As described above, the pH of the aqueous reaction solution is adjusted so as to be 12.0 to 14.0, preferably 12.0 to 13.5 in terms of the pH as measured at a liquid temperature of 25° C as a standard in the nucleation step.

When the pH is higher than 14.0, the produced nuclei may become too fine, and a problem of gelation of the aqueous reaction solution may occur in contrast, when the pH is less than 12.0, the growth reaction of the nuclei occurs along with formation of the nuclei; therefore, a range of the particle size distribution of the formed nuclei becomes broad and ununiform.

It is therefore necessary to adjust the pH of the aqueous reaction solution in the particle growth step to 12.0 to 14.0.

When the pH falls within this range, growth of the nuclei can be suppressed and almost only the nucleation can occur in the nucleation step, and the formed nuclei can be uniform and has a narrow range of the particle size distribution.
(Particle Growth Step)

As described above, the pH of the aqueous reaction solution is adjusted so as to be 10.5 to 12.0 in terms of the pH as measured at a liquid temperature of 25° C. as a standard in the particle growth step.

When the pH is higher than 12.0, a large number of nuclei are additionally produced and thus hydroxide particles having a favorable particle diameter distribution cannot be obtained. On the other hand, when the pH is less than 10.5, solubility of metal becomes high due to the presence of ammonium ions, thereby increasing metal without precipitation. Metal ions remaining in the liquid therefore unpreferably increases.

It is therefore necessary to adjust the pH of the aqueous reaction solution in the particle growth step to 10.5 to 12.0. When the pH falls within this range, only the growth of the nuclei produced in the nucleation step can preferentially occur, and additional nuclei formation can be suppressed. Accordingly, the formed nickel cobalt manganese composite hydroxide particles can be uniform and have a narrow range of the particle size distribution.

Since the pH of 12 is a boundary condition between the nucleation and the nuclear growth, the condition can be for either the nucleation step or the particle growth step, depending on presence or absence of the nuclei existing in the aqueous reaction solution.

That is, after causing nucleation in a large amount by increasing the pH in the nucleation step to higher than 12, the pH is adjusted to 12 in the particle growth step. Consequently, since a large amount of the nuclei are present in the aqueous reaction solution, the nuclei growth preferentially occurs, whereby the above hydroxide particles having a relatively large particle diameter and a narrow particle diameter distribution can be obtained.

On the other hand, in the state in which the nuclei are not present in the aqueous reaction solution, namely in the case of the pH adjusted to 12 in the nucleation step, the nucleation preferentially occurs because of the absence of the nuclei to be grown, whereas the produced nuclei can be grown by adjusting the pH to lower than 12 in the particle growth step to enable favorable hydroxide particles described above to be obtained.

In either case, the pH in the particle growth step may be controlled to be lower than the pH in the nucleation step.
(Amount of Nucleation)

Although an amount of the nucleation in the nucleation step is not particularly limited, the amount of nuclei is adjusted to be preferably from 0.1% to 2%, and more preferably 1.5% or less of the total amount, namely the amount of the entire metal salt supplied for obtaining composite hydroxide particles in order to obtain composite hydroxide particles having a favorable particle size distribution.
(Control of Particle Diameter of Composite Hydroxide Particles)

Since the particle diameter of the composite hydroxide particles can be controlled by means of the time period of the particle growth step, composite hydroxide particles having a desired particle diameter can be obtained by continuing the particle growth step until growth to give the desired particle diameter.

Additionally, the particle diameter of the composite hydroxide particles can be controlled not only in the particle growth step, but also by the pH and the amount of the raw material supplied for nucleation in the nucleation step.

That is, the number of the produced nuclei is increased by adjusting the pH in the nucleation to a higher pH, or by increasing the amount of the supplied raw material with longer time period of the nucleation. Thus, also in, the case where the particle growth step is performed under the same condition, the particle diameter of the composite hydroxide particles can be reduced.

On the other hand, by controlling the number of produced nuclei to be reduced, the resulting composite hydroxide particles can have a larger particle diameter.
(Description of Other Conditions)

Hereinafter, conditions such as the metal compounds, the ammonia concentration in the aqueous reaction solution, the reaction temperature, the atmosphere and the like are described, but the difference between the nucleation step and the particle growth step lies only in the range of controlling the pH of the aqueous reaction solution, and thus the conditions such as the metal compounds, the ammonia concentration in the aqueous reaction solution, the reaction temperature, the atmosphere, and the like are substantially similar between both steps.
(Metal Compounds)

As the metal compounds, a compound containing an intended metal is used. The compounds to be used are preferably water soluble compounds. Examples of the metal compounds include nitrate, sulfate and hydrochloride. For example, nickel sulfate, cobalt sulfate and manganese sulfate are preferably used.

When the mixed aqueous solution is formed, each metal compound is adjusted so that the ratio of the number of atoms of the metal ions present in the mixed aqueous solution corresponds to the ratio of the number of atoms of the metal ions in the intended composite hydroxide.
(Additional Element)

As the additional element (at least one element selected from the group consisting of Ti, V, Cr, Al, Mg, Zr, Nb, Mo, Hf, Ta and W), a water soluble compound is preferably used. Examples of the additional element include titanium sulfate, ammonium peroxotitanate, titanium potassium oxalate, vanadium sulfate, ammonium vanadate, chromium sulfate, potassium chromate, zirconium sulfate, zirconium nitrate, niobium oxalate, ammonium molybdate, sodium tungstate, and ammonium tungstate.

For causing such an additional element to be uniformly dispersed in the composite hydroxide particles, an additive containing the additional element may be added to the mixed aqueous solution. Coprecipitation is then enabled in the state in which the additional element is uniformly dispersed in the composite hydroxide particles.

Moreover, when surfaces of the composite hydroxide particles are covered with the additional element, for example, a slurry of the composite hydroxide particles is formed with an aqueous solution containing the additional element to cause the additional element to precipitate on the surfaces of the composite hydroxide particles by a crystallization reaction. Consequently, the surfaces thereof can be covered with the additional element. In this case, an alkoxide solution containing the additional element may he used instead of the aqueous solution containing the additional element. Further, the surfaces of the composite hydroxide particles can be covered with the additional element by spraying an aqueous solution or slurry containing the additional element onto the composite hydroxide particles followed by drying.

When the surfaces of the composite hydroxide particles are covered with the additional element, by reducing the ratio of the number of atoms of additional element ions present in the mixed aqueous solution by the amount just required for the covering, agreement with the ratio of the number of atoms of metal ions in the resulting composite hydroxide particles can be achieved.

Further, the step of covering the surfaces of the particles with the additional element may he performed to the particles after heating the composite hydroxide particles, that is, to the heat treated particles described above.

(Concentration of Mixed Aqueous Solution)

The concentration of the mixed aqueous solution is preferably 1 to 2.4 mol/L in terms of the total amount of the metal compounds. Even if the concentration of the mixed aqueous solution is less than 1 mol/L, a crystallization reaction of the composite hydroxide particles can be performed; however, the productivity is unpreferably reduced due to the smaller amount of crystallized product per the reaction vessel.

On the other hand, since the salt concentration of the mixed aqueous solution exceeding 2.4 mol/L is higher than saturated concentration at an ordinary temperature, there arises a risk of clogging in piping of the equipment by redeposition of the crystal or the like.

Additionally, the metal compounds may not necessarily be supplied to the reaction vessel in the form of the mixed aqueous solution. They may be supplied as aqueous solutions of respective metal compounds at a predetermined ratio into the reaction vessel so that total concentration of the metal compounds in the aqueous reaction solution falls within the above range.

Furthermore, the amount of the mixed aqueous solution etc., and aqueous solutions of respective metal compounds supplied to the reaction vessel are desirably adjusted so that a concentration of the crystallized product at the end of the crystallization reaction becomes about 30 to 200 g/l. When the concentration of the crystallized product is less than 30 g/l, aggregation of the primary particles may be insufficient, whereas the concentration exceeding 200 g/l may result in insufficient diffusion in the reaction vessel of the mixed aqueous solution to be added, whereby the particle growth may be biased.

(Ammonia Concentration)

In the reaction vessel, the ammonia concentration in the aqueous reaction solution is maintained at a constant value within the range of preferably 3 to 25 g/l so as not to cause the following problems.

First, ammonia acts as a complexing agent, and when the ammonia concentration is less than 3 g/l, solubility of the metal ions cannot be kept constant. Therefore, platelike hydroxide primary particles having regulated shapes and particle diameters cannot be formed, and gelatinous nuclei are likely to be produced, so that the particle size distribution is likely to be broad.

On the other hand, when the ammonia concentration exceeds 25 g/l, solubility of the metal ions becomes too high, whereby an amount of the metal ions remaining in the aqueous reaction solution increases to cause deviation of the composition and the like.

Additionally, when the ammonia concentration varies, solubility of the metal ions also varies, thereby leading to failure in formation of uniform hydroxide particles; therefore, maintaining the ammonia concentration at a constant value is preferred. For example, it is preferable to maintain the ammonia concentration at a desired concentration with the difference between the upper limit and the lower limit of about 5 g/l.

Although the ammonium ion donor is not particularly limited, for example, ammonia, ammonium sulfate, ammonium chloride, ammonium carbonate, ammonium fluoride and the like may be used.

(Temperature of Aqueous Reaction Solution)

In the reaction vessel, the temperature of the aqueous reaction solution is set to be preferably 20° C. or more, more preferably 20 to 60° C. When the temperature of the aqueous reaction solution is less than 20° C., generation of nuclei is likely to occur due to the low temperature, making the control difficult. To the contrary, when the temperature exceeds 60° C., volatilization of ammonia is promoted to lead to necessity of adding an excess amount of the ammonium ion donor for maintaining the predetermined ammonia concentration.

(Alkaline Aqueous Solution)

The alkaline aqueous solution for adjusting the pH in the reaction vessel is not particularly limited, and for example, an aqueous solution of an alkali metal hydroxide such as sodium hydroxide or potassium hydroxide may be used. When such an alkali metal hydroxide is used, it may be directly added to the mixed aqueous solution before being supplied to the reaction vessel; however, to add in the form of an aqueous solution to the aqueous reaction solution in the reaction vessel is preferred because of ease in controlling the pH of the aqueous reaction solution in the reaction vessel.

Also, the method for adding the alkaline aqueous solution to the reaction vessel is not particularly limited, and the alkaline aqueous solution may be added with a pump that enables a flow rate to be controlled such as a metering pump so that the pH of the aqueous solution in the reaction vessel is maintained within the predetermined range, while sufficiently stirring the mixed aqueous solution.

(Reaction Atmosphere)

Although the atmosphere during the reaction is not particularly limited, excessively oxidizing atmosphere is not preferred for ensuring stable production. The atmosphere during the reaction is preferably controlled at least in the particle growth step. For example, by performing the crystallization reaction with the oxygen concentration in the space within the reaction vessel controlled at 10% or less, unnecessary oxidization of the particles is suppressed, whereby particles having an even particle size can be obtained.

Furthermore, means for maintaining the space within the reaction vessel in such a state may include allowing an inert gas such as nitrogen to constantly flow in the vessel.

(Production Equipment)

In the method for producing the composite hydroxide particles of the present invention, used is an apparatus employing a system in which a product is not obtained until the reaction is completed. An example of the apparatus includes a commonly used batch reaction vessel equipped with a stirrer. When such an apparatus is employed, a problem of obtaining growing particles simultaneously with an overflowed liquid does not occur, as in the case of general continuous crystallization apparatuses in which the product is obtained by overflow. Particles having a narrow particle size distribution and an even particle diameter can therefore be obtained.

Additionally, in the case of controlling the reaction atmosphere, an apparatus in which the atmosphere can be controlled such as enclosed apparatus is preferred. When such an apparatus is used, the nucleation reaction and the particle growth reaction proceed almost evenly; therefore, particles excellent in the particle diameter distribution (namely, particles having a narrow range of the particle size distribution) can be obtained.

EXAMPLES

Concerning the composite hydroxide produced according to the method of the present invention, and the cathode active material produced according to the method of the present invention using this composite hydroxide as a raw material, average particle diameters and particle size distributions thereof were ascertained.

Additionally, concerning a secondary battery having a positive electrode produced by using the cathode active material produced according to the method of the present invention, performances (initial discharge capacity, cycle capacity retention rate, positive electrode resistance ratio) thereof were ascertained.

Hereinafter, the present invention is specifically described with Examples of the present invention, but the present invention is not any how limited to these Examples.
(Measurement of Average Particle Diameter and Particle Size Distribution)

Average particle diameters and particle size distributions (values represented by the expression of: [(d90−d10)/average particle diameter]) of the composite hydroxide and the cathode active material were calculated from volume-integrated values measured using a laser diffraction scattering type particle size distribution measurement apparatus (Microtrack HRA, manufactured by Nikkiso Co., Ltd.).

Crystal structures were also ascertained by X-ray diffraction measurement (X 'Pert PRO, manufactured by PANalytical Inc.).

Furthermore, compositions of the obtained composite hydroxide and cathode active material were ascertained by an ICP emission spectroscopy after dissolving a sample.
(Production of Secondary Battery)

For the evaluation, a winding type lithium secondary battery produced by the following method was used.

A positive electrode mixture paste was first prepared by mixing a cathode active material of 25° C., a conductive material including carbon black and a binder including polyvinylidene fluoride (PVDF) at a mass ratio of 85:10:5, and by dissolving the mixture in a solution of N-methyl-2-pyrrolidone (NMP).

The obtained positive electrode mixture paste was applied to both sides of aluminum foil by a comma coater to heat it at 100° C., followed by drying, whereby a positive electrode was obtained.

A positive electrode sheet with improved electrode density was prepared by applying a load to thus obtained positive electrode through a rolling press machine.

A negative electrode mixture paste was then prepared by dissolving an anode active material including graphite and PVDF of a binder at a mass ratio of 92.5:7.5 in an NMP solution.

The obtained negative electrode mixture paste was applied to both sides of copper foil by the comma coater to dry it at 120° C., whereby a negative electrode was obtained, similarly to the positive electrode. A negative electrode sheet with improved electrode density was prepared by applying a load to thus obtained negative electrode through the rolling press machine.

A winding type electrode assembly was formed by winding thus obtained positive electrode sheet and negative electrode sheet via a separator made of a microporous polyethylene sheet of its thickness of 25 µm. The winding type electrode assembly was inserted into a battery case so that lead tabs provided on the positive electrode sheet and the negative electrode sheet are connected to a positive electrode terminal and a negative electrode terminal, respectively.

Further, an electrolytic solution was prepared by dissolving $LiPF_6$ of lithium salt in an organic solvent including a mixed solution obtained by mixing ethylene carbonate (EC) and diethylene carbonate (DEC) at a volume ratio of 3:7 so as to be 1 mol/dm$^3$ in the electrolytic solution.

The obtained electrolytic solution was poured into the battery case into which the winding type electrode assembly was inserted. An opening of the battery case was then tightly sealed, followed by sealing the battery case, thereby producing a secondary battery.

The initial discharge capacity, the cycle capacity retention rate and the positive electrode resistance ratio for evaluating performances of the produced secondary battery were defined as follows.

For determining the initial discharge capacity, the secondary battery was left to stand for about 24 hours. After an open circuit voltage (OCV) was stabilized, the secondary battery was charged with an electric current density to the positive electrode 0.5 mA/cm$^2$ up to a cut-off voltage of 4.3 V. After pausing for 1 hour, the secondary battery was discharged down to a cut-off voltage of 3.0 V and a capacity at that time was determined as an initial discharge capacity.

For determining the cycle capacity retention rate, 500-cycle charging and discharging were repeated with an electric current density to the positive electrode 3.0 mA/cm$^2$ and a cut off voltage of 4.3 to 3.0 V at a temperature of 60° C. A ratio of the discharge capacity after the repetition to the initial discharge capacity was calculated to determine a capacity retention rate.

Figure 8:
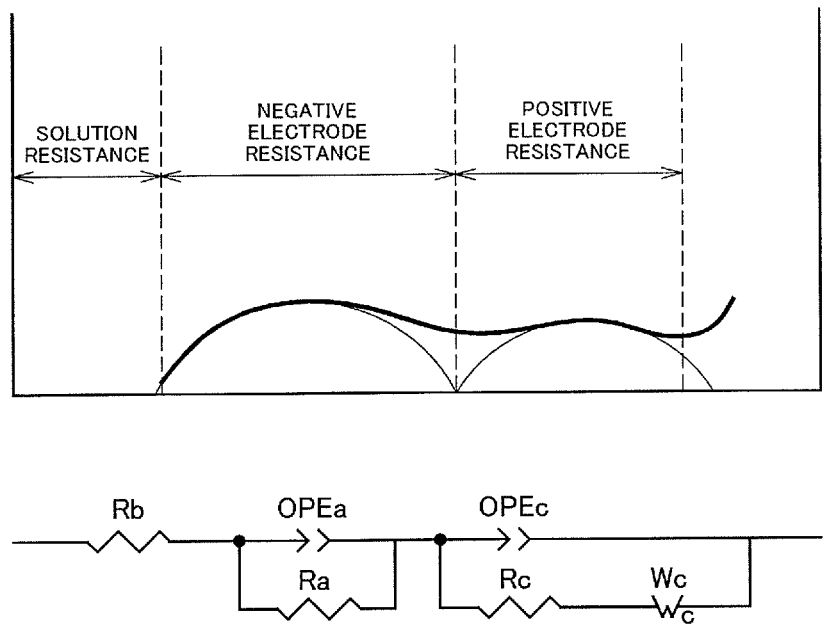
FIG. 8 shows an example of measurement for evaluation of an impedance and an equivalent circuit used in analysis.

Further, for the positive electrode resistance ratio, the secondary battery was charged at a charging potential of 4.1 V, and then a frequency response analyzer and a Potentio/Galvanostat were used for measurement with an alternating current impedance method to obtain a Nyquist plot shown in FIG. 8. This Nyquist plot illustrates the sum of characteristic curves showing a solution resistance, a negative electrode resistance and a capacity thereof, and a positive electrode resistance and a capacity thereof. Therefore, a value of the positive electrode resistance was calculated using an equivalent circuit based on this Nyquist plot by fitting calculation. A ratio of the value of this positive electrode resistance to a value of a positive electrode resistance described later in Comparative Example 1 was then determined as the positive electrode resistance ratio.

In Examples of the present invention, respective samples of special grade reagents manufactured by Wako Pure Chemical Industries, Ltd. were used for producing composite hydroxides, cathode active materials and secondary batteries.

Example 1

(Step of Producing Composite Hydroxide)

A composite hydroxide was produced as in the following with the method of the present invention.

A reaction vessel of 34 L was first filled half full of water. Thereafter, while stirring the water, a temperature in the vessel was set to 40° C., and nitrogen gas was introduced into the vessel to form a nitrogen atmosphere. At that time, a concentration of oxygen in the space of the vessel was 2.0%.

A 25% aqueous sodium hydroxide solution and a 25% aqueous ammnia were added into water in the reaction vessel in appropriate amounts, and an aqueous solution before the reaction in the vessel was adjusted to have a pH of 12.6 in terms of the pH as measured at a liquid temperature of 25° C. as a standard. Additionally, the ammonia concentration in the aqueous solution before the reaction was adjusted to 10 g/l.
(Nucleation Step)

Next, nickel sulfate, cobalt sulfate, manganese sulfate, zirconium sulfate and sodium tungstate were dissolved in water to form a 1.8 mol/L mixed aqueous solution. In this mixed aqueous solution, a molar ratio of each metal element was adjusted so as to give Ni:Co:Mn:Zr:W of 0.33:0.33:0.33:0.005:0.005.

The above mixed aqueous solution was added to the aqueous solution before the reaction in the reaction vessel at a rate of 88 ml/min. A 25% aqueous ammonia and a 25% aqueous sodium hydroxide solution were also added simultaneously to the aqueous solution before the reaction in the reaction vessel at a constant rate, and thus nucleation was performed by performing crystallization for 2 minutes and 30 seconds while the pH was controlled at 12.6 (pH for nucleation) with the ammonia concentration in an aqueous reaction solution maintained at the aforementioned value.
(Particle Growth Step)

Thereafter, supply of only the 25% aqueous sodium hydroxide solution was temporarily stopped until the pH of the aqueous reaction solution became 11.6 (pH for particle growth) in terms of the pH as measured at a liquid temperature of 25° C. as a standard.

After the pH of the aqueous reaction solution reached 11.6 in terms of the pH as measured at a liquid temperature of 25° C. as a standard, supply of the 25% aqueous sodium hydroxide solution was started again to perform particle growth by continuing the crystallization for 2 hours while the pH was kept controlled at 11.6.

When the reaction vessel was filled up, the crystallization was terminated and the stirring was stopped, and the mixture was stood still to induce precipitation of a product. After a half amount of the supernatant was drawn out from the reaction vessel, crystallization was started again to perform the crystallization for 2 hours (for 4 hours in total), and then the crystallization was completed. Thereafter, the product was washed with water, filtrated and dried to obtain particles.

Thus obtained particles were composite hydroxide particles represented by $Ni_{0.33}Co_{0.33}Mn_{0.33}Zr_{0.005}W_{0.005}(OH)_{2+\alpha}$ ($0 \leq \alpha \leq 0.5$).

As shown in FIG. 5, measurement of the particle size distribution of the composite hydroxide particles verified that the average particle diameter was 3.6 μm, and the value represented by the expression of: [(d90−d10)/average particle diameter] was 0.48.

According to SEM photographs (FIG. 6) showing results of observation of the obtained composite hydroxide particles with an SEM (scanning electron microscope S-4700, manufactured by Hitachi High-Technologies Corporation), it was ascertained that the secondary particles were formed by platelike primary particles with their thickness of about 200 nm and their length of about 1000 nm randomly aggregating.
(Step of Producing Cathode Active Material)

The above composite hydroxide particles were subjected to a heat treatment in an ambient air at 150° C. for 12 hours. Thereafter, lithium carbonate was weighed so that a ratio of Li/Me became 1.15, and mixed with the heat treated composite hydroxide particles to form a mixture. The mixing was performed using a shaker-mixer apparatus (TURBULA Type T2C, manufactured by Willy A Bachofen (WAB) AG).

Thus obtained mixture was subjected to calcination in an air flow (oxygen: 21% by volume) at 760° C. for 4 hours, thereafter fired at 950° C. for 10 hours, followed by disintegrating to obtain a cathode active material.

As shown in FIG. 5, measurement of the particle size distribution of the obtained cathode active material revealed that the average particle diameter was 3.8 μm, and the value represented by the expression of: [(d90−d10)/average particle diameter] was 0.55.

Figure 7:
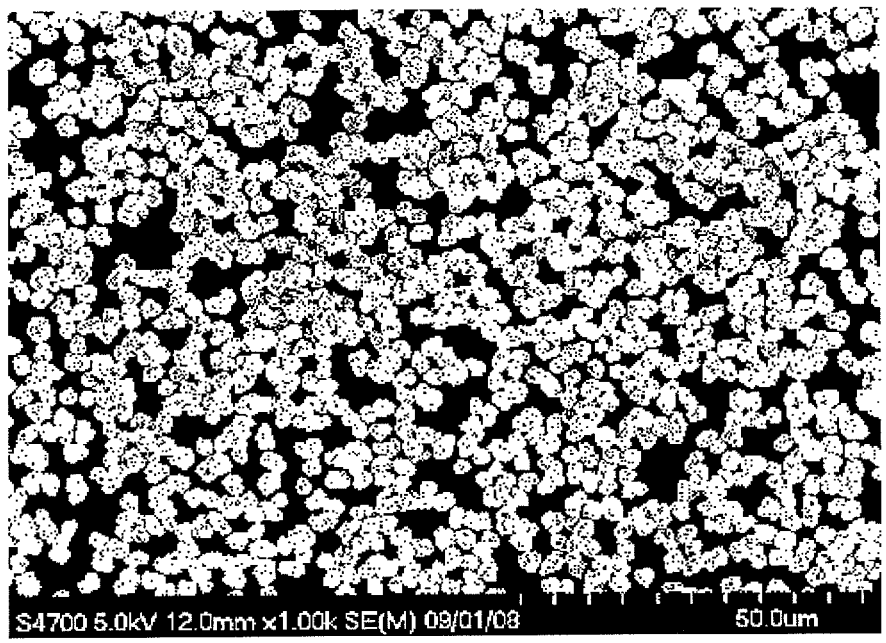
FIG. 7 shows an SEM photograph (magnification of observation: ×1,000) of the lithium nickel cobalt manganese composite oxide of the present invention.

Moreover, when an SEM observation of the cathode active material was performed in a similar manner to the composite hydroxide particles, it was ascertained that the obtained cathode active material was nearly spherical, and had an almost even particle diameter as shown in the SEM photograph (FIG. 7).

A powder X-ray diffraction analysis of the obtained cathode active material with a Cu-Kα ray also revealed that the material had a single phase of a hexagonal layered crystal lithium-nickel-cobalt-manganese composite oxide.

Furthermore, a chemical analysis of the cathode active material verified a composition containing Li of 7.83% by mass, Ni of 19.1% by mass, Co of 19.2% by mass, Mn of 17.9% by mass, Zr of 0.46% by mass and W of 0.93% by mass, indicating to be $Li_{1.146}Ni_{0.33}Co_{0.33}Mn_{0.33}Zr_{0.005}W_{0.005}O_2$.
(Battery Evaluation)

A secondary battery having a positive electrode formed using the cathode active material was subjected to a charge and discharge test, and revealed that the secondary battery had an initial discharge capacity of 158.0 mAh/g and a capacity retention rate of 91% after 500 cycles, as shown in FIG. 5. Additionally, the positive electrode resistance ratio was 0.57.

With regard to Examples 2 to 15 and Comparative Examples 1 to 7 below, only the substances and conditions changed from the aforementioned Example 1 are referred to. Additionally, results of each evaluation of Examples 2 to 15 and Comparative Examples 1 to 7 are shown in FIG. 5.

Example 2

A cathode active material for a nonaqueous electrolyte secondary battery was obtained and evaluated in a similar manner to Example 1 except that mixing was performed so that Li/Me became 1.10.

Example 3

A cathode active material for a nonaqueous electrolyte secondary battery was obtained and evaluated in a similar manner to Example 1 except that mixing was performed so that Li/Me became 1.12 and the firing conditions of the temperature at 970° C. for 10 hours were employed.

Example 4

A cathode active material for a nonaqueous electrolyte secondary battery was obtained and evaluated in a similar manner to Example 1 except that the firing conditions of the temperature at 900° C. for 10 hours were employed.

Example 5

A cathode active material for a nonaqueous electrolyte secondary battery was obtained and evaluated in a similar manner to Example 1 except that the conditions for calcinations of the temperature at 400° C. for 10 hours were employed.

Example 6

A cathode active material for a nonaqueous electrolyte secondary battery was obtained and evaluated in a similar manner to Example 1 except that calcination was not performed and firing was performed at 950° C. for 10 hours.

Example 7

A cathode active material for a nonaqueous electrolyte secondary battery was obtained and evaluated in a similar manner to Example 1 except that the mixed aqueous solution was prepared so that the molar ratio of the metal elements in terms of Ni:Co:Mn:Zr became 0.33:0.33:0.33:0.01 in the step of producing the composite hydroxide.

Example 8

A cathode active material for a nonaqueous electrolyte secondary battery was obtained and evaluated in a similar manner to Example 1 except that the mixed aqueous solution was prepared so that the molar ratio of the metal elements in terms of Ni:Co:Mn:Zr:W:Nb became 0.328:0.328:0.328:0.005:0.005:0.005 in the step of producing the composite hydroxide.

Example 9

A cathode active material for a nonaqueous electrolyte secondary battery was obtained and evaluated in a similar manner to Example 1 except that the mixed aqueous solution was prepared so that the molar ratio of the metal elements in terms of Ni:Co:Mn:Zr:W became 0.397:0.297:0.297:0.005:0.005 and the firing conditions of the temperature at 930° C. for 10 hours were employed in the step of producing the composite hydroxide.

Example 10

A cathode active material for a nonaqueous electrolyte secondary battery was obtained and evaluated in a similar manner to Example 1 except that, in the step of producing the composite hydroxide, the mixed aqueous solution was prepared so that the molar ratio of the metal elements in terms of Ni:Co:Mn:Zr became 0.498:0.248:0.248:0.005; pH for nucleation was adjusted to 12.8; mixing was performed so that Li/Me became 1.05; and the firing conditions of the temperature at 900° C. for 10 hours were employed.

Example 11

A cathode active material for a nonaqueous electrolyte secondary battery was obtained and evaluated in a similar manner to Example 1 except that mixing was performed so that Li/Me became 1.10 and the firing conditions of the temperature at 860° C. for 10 hours were employed.

Example 12

A cathode active material for a nonaqueous electrolyte secondary battery was obtained and evaluated in a similar manner to Example 1 except that the mixed aqueous solution was prepared so that the molar ratio of the metal elements in terms of Ni:Co:Mn became 0.333:0.333:0.333 and a hydroxide without the additional element M was obtained in the step of producing the composite hydroxide.

Example 13

A cathode active material for a nonaqueous electrolyte secondary battery was obtained and evaluated in a similar manner to Example 1 except that crystallization time period for nucleation was adjusted to 30 seconds in the step of producing the composite hydroxide.

Example 14

A cathode active material for a nonaqueous electrolyte secondary battery was obtained and evaluated in a similar manner to Example 1 except that the temperature in the vessel was adjusted to 50° C. and the ammonia concentration was adjusted to 20 g/l in the step of producing the composite hydroxide.

Example 15

A small-size reaction vessel of 5 L was filled half full of water. Thereafter, while stirring the water, a temperature in the vessel was set to 40° C. and nitrogen gas was introduced into the vessel to form a nitrogen atmosphere. A 25% aqueous sodium hydroxide solution and a 25% aqueous ammonia were added thereto in appropriate amounts, and an aqueous solution before the reaction in the vessel was adjusted to have a pH of 12.6 in terms of the pH as measured at a liquid temperature of 25° C. as a standard and the ammonia concentration in the solution was adjusted to 10 g/l. Subsequently, a 1.8 mol/L mixed aqueous solution prepared by dissolving nickel sulfate, cobalt sulfate, manganese sulfate, zirconium sulfate and sodium tungstate (molar ratio of metal elements Ni:Co:Mn:Zr:W=0.33:0.33:0.33:0.005:0.005) in water, and a 25% aqueous ammonia and a 25% aqueous sodium hydroxide solution were added to the aforementioned aqueous reaction solution at a constant rate with the ammonia concentration in the aqueous reaction solution maintained at the above value. Seed crystals were then obtained by performing crystallization for 2 minutes and 30 seconds while the pH was controlled at 12.6 (pH for nucleation), similarly to the Example 1. Another reaction vessel of 34 L was filled half full of water. Thereafter, while stirring the water, a temperature in the vessel was set to 40° C. and nitrogen gas was introduced into the vessel to form a nitrogen atmosphere. An oxygen concentration in the space within the reaction vessel at that time was 2.0%. A 25% aqueous sodium hydroxide solution and a 25% aqueous ammonia were added thereto in appropriate amounts, and an aqueous components-adjusted solution in the vessel was adjusted to have a pH of 11.6 in terms of the pH as measured at a liquid temperature of 25° C. as a standard, and an ammonia concentration in the solution was adjusted to 10 g/l. After the aqueous reaction solution containing the seed crystals obtained in the aforementioned small-size reaction vessel was introduced in this reaction vessel, the mixed aqueous solution, an aqueous ammonia and an aqueous sodium hydroxide solution were added with the pH controlled at 11.6, and then particle growth was performed by continuing the crystallization for 2 hours, similarly to Example 1. When the reaction vessel was filled up, the crystallization was terminated and the stirring was stopped, and the mixture was stood still to induce precipitation of a product. After a half amount of the supernatant was drawn out, crystallization was started again. After the crystallization was performed for 2 hours (for 4 hours in total), the crystallization was completed. Then, the product was washed with water, filtrated and dried. A cathode active material for a nonaqueous electrolyte secondary battery was obtained and evaluated in a similar manner to Example 1 with regard to the subsequent steps. FIG. 5 shows an average particle diameter and a value represented by the expression of: [(d90−d10)/average particle diameter] of the obtained composite hydroxide particles, an average particle diameter and a value represented by the expression of: [(d90−d10)/average particle diameter] of the obtained cathode active material, an initial discharge capacity, a capacity retention rate after 500 cycles, and a positive electrode resistance ratio.

Example 16

A cathode active material for a nonaqueous electrolyte secondary battery was obtained and evaluated in a similar manner to Example 15 except that the pH at the time of producing the seed crystals (pH for nucleation was adjusted to 13.5, time period for producing the seed crystals was 1 minute 15 seconds, and the ammonia concentration was adjusted to 15 g/l in the step of producing the composite hydroxide. FIG. 5 shows an average particle diameter and a value represented by the expression of: [(d90−d10)/average particle diameter] of the obtained composite hydroxide particles, an average particle diameter and a value represented by the expression of: [(d90−d10)/average particle diameter] of the obtained cathode active material, an initial discharge capacity, a capacity retention rate after 500 cycles, and a positive electrode resistance ratio.

Comparative Example 1

Using a reaction vessel of 34 L for continuous crystallization provided with a piping for overflowing at a top part, crystallization was performed in which a mixed aqueous solution having metal salt dissolved therein, an aqueous ammonia solution and a neutralizer solution were added continuously at a constant flow rate, similarly to Example 1, while maintaining the pH of the liquid at a constant value of 12.0 in terms of the pH as measured at a liquid temperature of 25° C. as a standard, and a overflowing slurry was continuously obtained. A mean residence time in the vessel was regulated to be 4 hours, and the composite hydroxide particles were obtained by obtaining the slurry after an equilibrium state was attained in the reaction vessel, followed by solid-liquid separation. A cathode active material for a nonaqueous electrolyte secondary battery was obtained by using the obtained composite hydroxide particles according to the step of producing the cathode active material similar to Example 1, and evaluated.

Comparative Example 2

A cathode active material for a nonaqueous electrolyte secondary battery was obtained and evaluated in a similar manner to Example 1 except that the pHs during the nucleation and during the particle growth of the aqueous reaction solution were maintained at a constant value of 11.6 in terms of the pH as measured at a liquid temperature of 25° C. as a standard in the step of producing the composite hydroxide.

Comparative Example 3

Nickel cobalt manganese composite hydroxide particles were obtained in a similar manner to Example 1 except that the pHs during the nucleation and during the particle growth of the aqueous reaction solution were maintained at a constant value of 12.6 in terms of the pH as measured at a liquid temperature of 25° C. as a standard in the step of producing the composite hydroxide. The obtained composite hydroxide included particles having an indeterminate form containing gelatinous deposited matter. Thus, the production of the cathode active material was stopped due to difficulty in the solid-liquid separation.

Comparative Example 4

A cathode active material for a nonaqueous electrolyte secondary battery was obtained and evaluated in a similar manner to Example 1 except that the firing conditions of the temperature at 1050° C. for 10 hours were employed.

Comparative Example 5

A cathode active material for a nonaqueous electrolyte secondary battery was obtained and evaluated in a similar manner to Example 1 except that the ratio of Li/Me became 1.25.

Comparative Example 6

A cathode active material for a nonaqueous electrolyte secondary battery was obtained and evaluated in a similar manner to Example 1 except that the ratio of Li/Me became 0.90.

Comparative Example 7

A cathode active material for a nonaqueous electrolyte secondary battery was obtained and evaluated in a similar manner to Example 1 except that the metal salt solution was prepared so that the molar ratio of the metal elements in terms of Ni:Co:Mn:Zr became 0.3234:0.3233:0.3233:0.03 in the step of producing the composite hydroxide.

(Evaluation)

Since the composite hydroxide particles and cathode active materials of Examples 1 to 16 were produced according to the present invention, both of the average particle diameters and the values represented by the expression of: [(d90−d10)/average particle diameter] as a marker indicating spreading of the particle size distribution fell within a preferable range, and the particles had a favorable particle diameter distribution and an almost even particle diameter.

The nonaqueous electrolyte secondary batteries produced using these cathode active materials had a high initial discharge capacity, excellent cycle characteristics, and also a low positive electrode resistance. Accordingly, batteries having excellent characteristics were provided.

Since a continuous crystallization method was used in Comparative Example 1, the nucleation and the particle growth could not be separatively performed, leading to failure in keeping the particle growth time period constant; therefore, a broad particle size distribution was provided. Accordingly, the secondary battery had inferior cycle characteristics although a high initial discharge capacity was attained.

In Comparative Example 2, since the pHs during both the nucleation and the particle growth were 12 or less, the amount of nucleation was insufficient, and thus the composite hydroxide particles and the cathode active material both had large particle diameters. Accordingly, the secondary battery in which this cathode active material was used had an insufficient surface area for reaction, and resulted in a high positive electrode resistance.

In Comparative Example 3, since the pHs during both the nucleation and the particle growth were 12 or more, additional nuclei were generated during the overall period of the crystallization reaction. Therefore, a broad particle size distribution was provided, and also production of the cathode active material became difficult.

Since the steps of producing the cathode active materials in Comparative Examples 4 to 6 were distinct from those of the present invention, a cathode active material having favorable characteristics could not be obtained. The nonaqueous electrolyte secondary batteries in which these cathode active materials were used had a larger positive electrode resistance, and also had both inferior initial discharge capacity and cycle characteristics.

Further, since the atomic ratio of the additional elements was higher than the range of the present invention in Comparative Example 7, the secondary battery had inferior initial discharge capacity and positive electrode resistance although a favorable particle size distribution was attained.

From the above results, it is ascertained that when nickel cobalt manganese composite hydroxide particles and a cathode active material are produced by using the production method of the present invention, a nonaqueous electrolyte secondary battery in which this cathode active material is used has a high initial discharge capacity, excellent cycle characteristics, and a low positive electrode resistance, indicating production of a battery having excellent characteristics.

INDUSTRIAL APPLICABILITY

The nonaqueous electrolyte secondary battery of the present invention is suitable for electric power supplies for small size mobile electronic devices which consistently require a high capacity (notebook-sized personal computers, mobile phone terminals, etc.), and also suitable for batteries for electric automobiles which require high power.

Additionally, the nonaqueous electrolyte secondary battery of the present invention is excellent in safety, and size reduction and increase of the output are possible; therefore, the present battery is suitable for electric power supplies for electric automobiles having limited mounting space.

It should be noted that the present invention can be adopted not only to an electric power supply for electric automobiles exclusively driven by electric energy, but also to an electric power supply for so-called hybrid automobiles in which combustion engine such as a gasoline engine or diesel engine is used in combination.

The invention claimed is:

1. A method for producing a cathode active material for a nonaqueous electrolyte secondary battery being a method for producing a cathode active material represented by a general formula: $Li_{1+u}Ni_xCo_yMn_zM_tO_2$, where $-0.05 \leq u \leq 0.20$, $x+y+z+t=1$, $0.3 \leq x \leq 0.7$, $0.1 \leq y \leq 0.4$, $0.1 \leq z \leq 0.4$, $0 \leq t \leq 0.02$, and M is at least one additional element selected from the group consisting of Ti, V, Cr, Al, Mg, Zr, Nb, Mo, Hf, Ta and W, the cathode active material including a lithium nickel cobalt manganese composite oxide of a composite oxide containing lithium with a layer structure belonged in hexagonal crystal system; and the method comprising:
    a nucleation step of performing nucleation b controlling a pH of an aqueous solution for nucleation containing a metal compound having nickel, cobalt and manganese, and an ammonium ion donor to 12.0 to 14.0 in terms of the pH as measured at a liquid temperature of 25° C. as a standard; and
    after completion of the nucleation step, starting a particle growth step of growing nuclei by controlling a pH of an aqueous solution for particle growth containing nuclei formed in the nucleation step to 10.5 to 12.0 in terms of the pH as measured at a liquid temperature of 25° C. as a standard,
    a mixing step of forming a mixture by mixing a lithium compound with particles after the heat treatment, and adjusting a ratio of a sum of the numbers of atoms of metals other than lithium to the number of atoms of lithium included in the mixture to 1:0.95 to 1.20; and
    a firing step of firing the mixture formed in the mixing step at a temperature of 800° C. to 1000° C.

2. The method for producing a cathode active material for a nonaqueous electrolyte secondary battery according to claim 1, herein
    calcination is performed at a temperature of 350° C. to 800° C. before the firing step.

* * * * *